(12) United States Patent
Voois et al.

(10) Patent No.: US 6,215,515 B1
(45) Date of Patent: Apr. 10, 2001

(54) VIDEOCOMMUNICATING DEVICE WITH AN ON-SCREEN TELEPHONE KEYPAD USER-INTERFACE METHOD AND ARRANGEMENT

(75) Inventors: Paul A. Voois, Sunnyvale; Bryan R. Martin, Campbell; Philip Bednarz; Keith Barraclough, both of Menlo Park; Truman Joe, San Jose, all of CA (US)

(73) Assignee: Netergy Networks, Inc., Santa Clara, CA (US)

( * ) Notice: Subject to any disclaimer, the term of this patent is extended or adjusted under 35 U.S.C. 154(b) by 0 days.

(21) Appl. No.: 09/095,448

(22) Filed: Jun. 10, 1998

Related U.S. Application Data

(63) Continuation-in-part of application No. 09/005,053, filed on Jan. 9, 1998, now Pat. No. 6,124,882, which is a continuation-in-part of application No. 08/908,826, filed on Aug. 8, 1997, now Pat. No. 5,790,712, which is a continuation of application No. 08/658,917, filed on May 31, 1996, now abandoned, which is a continuation of application No. 08/303,973, filed on Sep. 9, 1994, now abandoned, which is a continuation of application No. 07/838,382, filed on Feb. 19, 1992, now Pat. No. 5,379,351.

(51) Int. Cl.[7] ........................................ H04N 7/14
(52) U.S. Cl. .................. 348/14; 379/93.17; 379/93.21; 379/93.26; 379/102.01; 379/102.02
(58) Field of Search .............................. 348/14, 15, 17, 348/18; 379/93.21, 93.17, 93.23, 93.26, 102.01, 102.02, 102.03

(56) References Cited

U.S. PATENT DOCUMENTS

| | | |
|---|---|---|
| 4,485,400 | 11/1984 | Lemelson . |
| 4,532,378 | 7/1985 | Nakayama . |
| 4,715,059 | 12/1987 | Cooper-Hart . |
| 4,737,980 | 4/1988 | Curtin . |
| 4,829,372 | 5/1989 | McCalley . |
| 4,954,886 | * 9/1990 | Elberbaum ................... 379/102.01 |
| 5,136,628 | 8/1992 | Araki . |
| 5,236,199 | 8/1993 | Thompson . |
| 5,389,965 | * 2/1995 | Kuzma ................... 348/14 |
| 5,412,708 | 5/1995 | Katz . |
| 5,495,284 | 2/1996 | Katz . |
| 5,539,452 | 7/1996 | Bush . |
| 5,570,134 | * 10/1996 | Hong ................... 348/467 |
| 5,640,195 | 6/1997 | Chida . |
| 5,675,375 | * 10/1997 | Riffee ................... 379/93.21 |
| 5,734,414 | * 3/1998 | Nishimura et al. .............. 348/14 |
| 5,760,824 | * 6/1998 | Hicks, III ................... 348/14 |
| 5,805,677 | * 9/1998 | Ferry et al. ............... 379/93.23 |
| 5,892,537 | * 4/1999 | Georges et al. ........... 379/93.06 |
| 5,936,679 | * 8/1999 | Kasahara et al. ............ 348/14 |
| 5,963,245 | * 4/1999 | McDonald ................... 348/14 |
| 5,999,207 | * 12/1999 | Rodriguez et al. ......... 379/93.17 |

* cited by examiner

Primary Examiner—Stella Woo
(74) Attorney, Agent, or Firm—Crawford PLLC

(57) ABSTRACT

A videophone apparatus with an on-screen telephone keypad user-interface. The videophone communicates video and audio data over a plain old telephone service (POTS) line and includes a video source and a communication channel interface circuit coupled to a programmable processor. The programmable processor is configured and arranged to execute a user interface program for user controlled operation of the videophone apparatus, display a first menu on the display, the first menu referencing a first plurality of options for operating the videophone apparatus and having associated therewith respective indicators of telephone keypad buttons, receive from the telephone keypad a first selection signal indicative of a pressed button, and initiate an operation to control the videophone apparatus in response to the first selection signal.

22 Claims, 26 Drawing Sheets

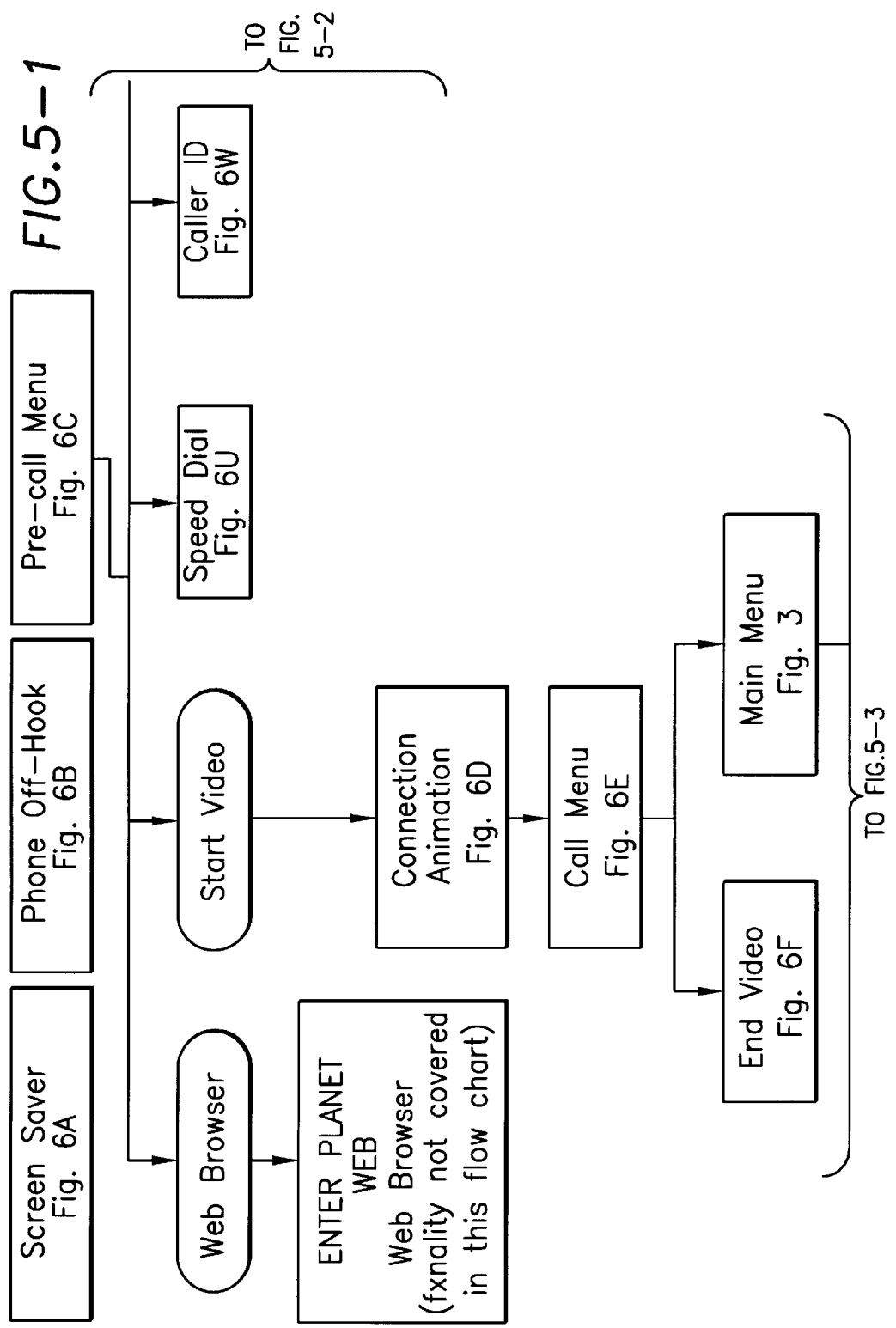

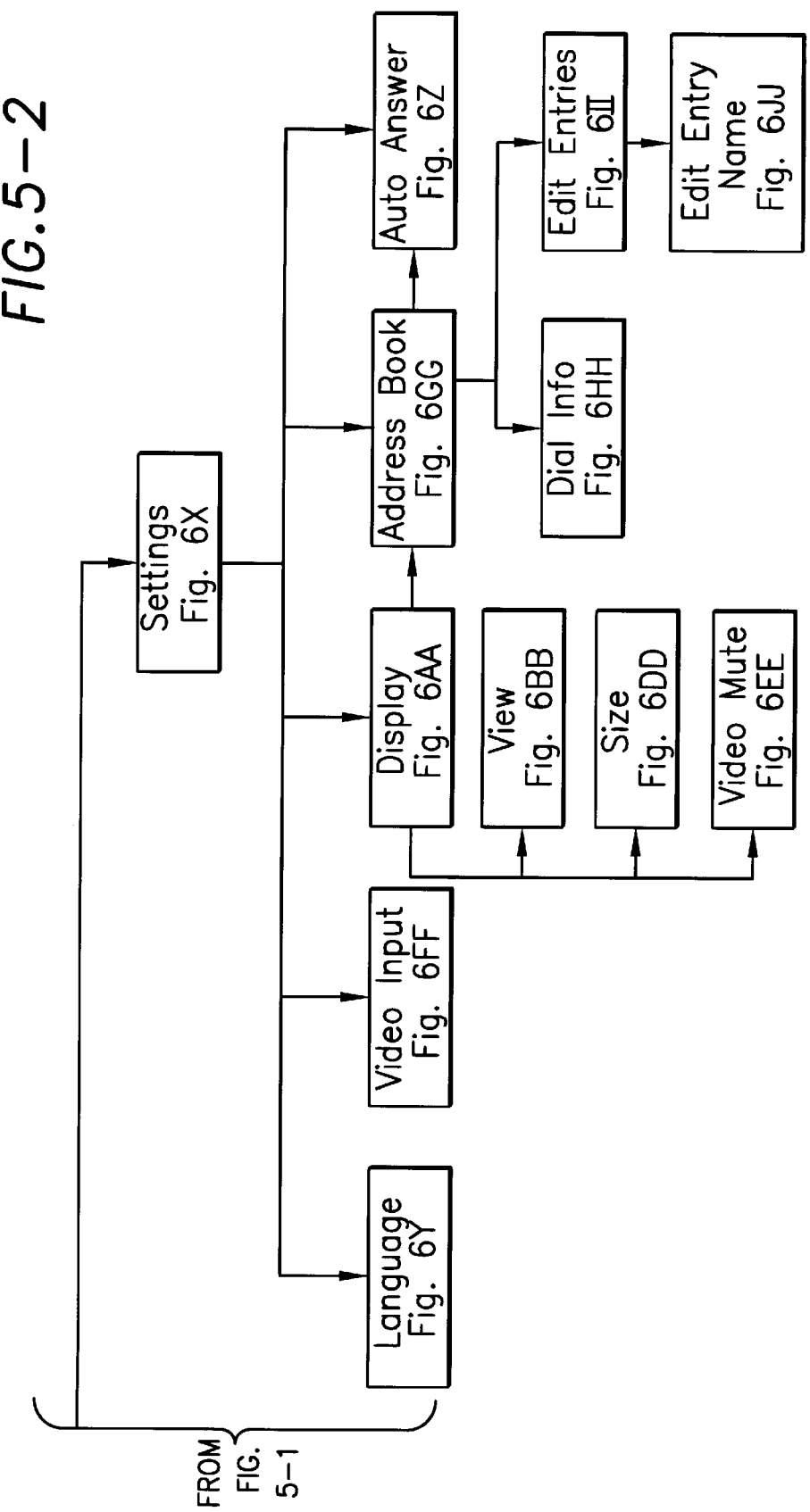

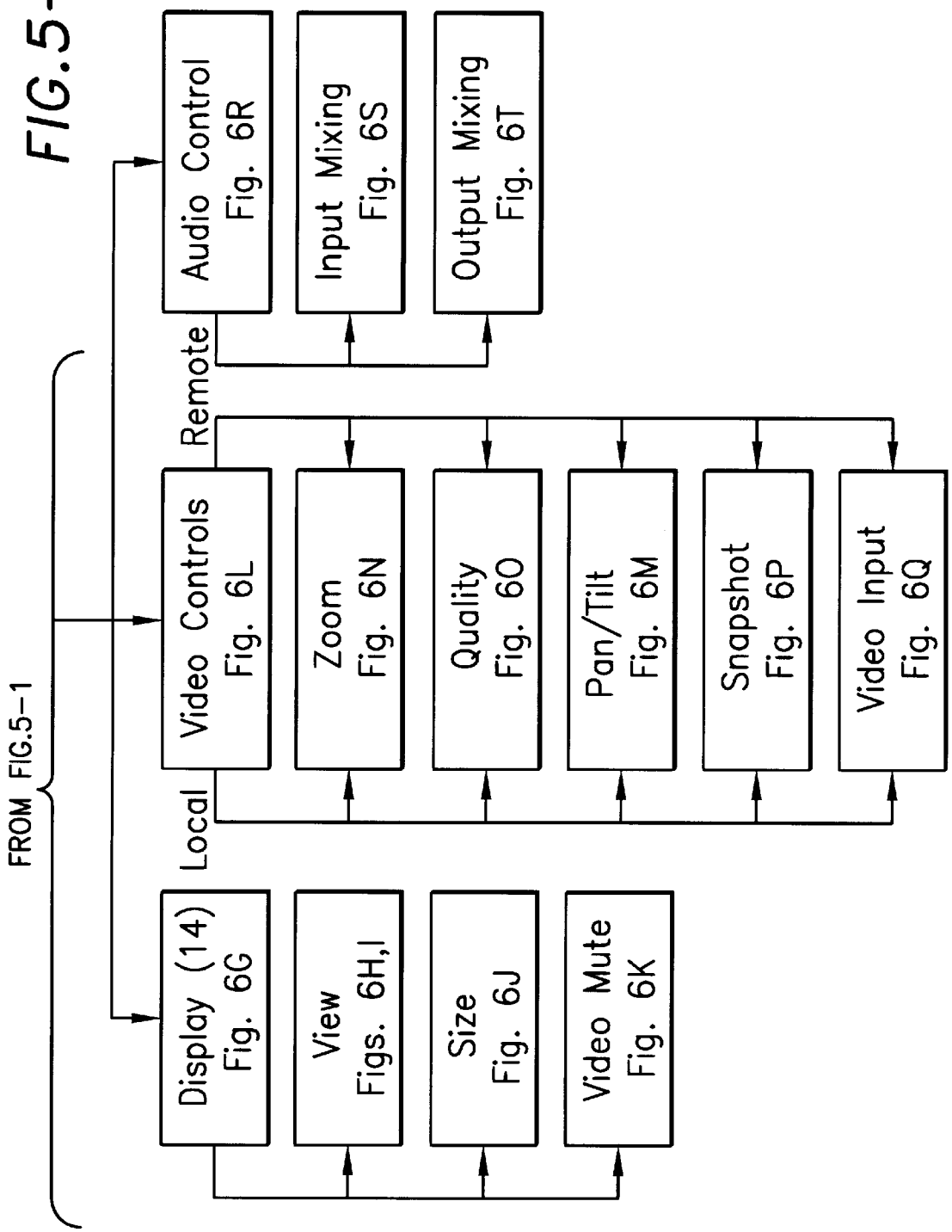

VIDEOCOMMUNICATING DEVICE WITH AN ON-SCREEN TELEPHONE KEYPAD USER-INTERFACE METHOD AND ARRANGEMENT

The present application is a continuation-in-part of U.S. patent application Ser. No. 09/005,053, now U.S. Pat. No. 6,124,882, entitled, "Videocommunicating Apparatus and Method Therefor" and filed Jan. 9, 1998, now U.S. Pat. No. 6,124,882 which is a continuation-in-part of 08/908,826, entitled, "Video Compression/Decompression Processing and Processors," filed Aug. 8, 1997 (now U.S. Pat. No. 5,790,712), which is a continuation of U.S. patent application Ser. No. 08/658,917, entitled "Video Compression and Decompression Processing and Processors", filed May 31, 1996 (now abandoned), which is a continuation of 08/303, 973, filed Sep. 9, 1994 (now abandoned), which is a continuation of U.S. patent application Ser. No. 07/838,382, filed on Feb. 19, 1992, entitled, "Video Compression/ Decompression Processing and Processing and Processors," (now U.S. Pat. No. 5,379,351).

This application is also related to, and fully incorporates by reference, U.S. Pat. application Ser. No. 08/708,184, entitled "Video Compression and Decompression Arrangement Having Reconfigurable Camera and Low-Bandwidth Transmission Capability", filed Sep. 6, 1996, which is a continuation-in-part of U.S. patent application Ser. No. 08/457,516, entitled "Integrated Multimedia Communications Processor and Codec," filed May 31, 1995 (now abandoned).

FIELD OF THE INVENTION

The present invention relates to video communication systems, and more particularly, to a user interface for a programmable videocommunicator architecture for videoconferencing over a conventional communications channel.

BACKGROUND OF THE INVENTION

Video communication systems span a variety of applications. One such application is videoconferencing. Videoconferencing typically involves the real-time sharing of video along with audio, graphics and/or data information between two or more terminals over a communications channel. A videoconferencing session may involve merely a video-enabled telephone call between two friends or, in a more complex application, a multi-way call among corporate boardrooms with advanced camera control and with sharing of data applications such as word processors and spreadsheets and using ISDN digital lines or T1 lines for communication.

Videoconferencing technology has been evolving very rapidly. The evolution began with a number of proprietary products, offered by various vendors and communicatively incompatible with each other. As the demand for equipment compatibility grew, vendors and scientific experts began to cooperate and, through a standards body such as the International Telecommunications Union (ITU), industry standards have been and are being adopted. This has typically involved the effort of an industry-wide consortium, such as the International Multimedia Teleconferencing Consortium (IMTC), to iron out implementation details of the standards, agree on the interpretation of sections of the standards that are unclear, and test each of the vendor's products against those provided by other vendors.

Once a baseline level of interoperability has been established, the vendors proceed to bring their standards-compliant products to market, and continue to add their own features to gain competitive advantage. While preserving standards compliance, the vendors differentiate their products from those of other vendors based on price, video/audio quality, and ease-of-use. The mass consumer market demands that such products provide audio/video quality with insubstantial communication-related delays and at extremely low costs. Accordingly, such demands have been difficult to meet.

SUMMARY OF THE INVENTION

The present invention is directed to a videophone apparatus having an on-screen telephone keypad user-interface method and arrangement. In a first embodiment, the videophone comprises: a video source configured and arranged to capture images and to generate video data representing the images; a POTS interface circuit, configured and arranged to transmit and receive video and audio data over the POTS line; a programmable processor circuit coupled to the video source and to the interface circuit and having a first section, including a DSP-type processor, configured and arranged to encode and decode video data, including the video data generated by the video source, and having a controller section, including a RISC-type processor, communicatively coupled to the first section, the controller section configured and arranged to execute a stored program for user controlled operation of the videophone apparatus, display a first menu on the display, the first menu referencing a first plurality of options for operating the videophone apparatus and having associated therewith respective indicators of telephone keypad buttons, receive from the telephone keypad a first selection signal indicative of a pressed button, and initiate an operation to control the videophone apparatus in response to the first selection signal; an EEPROM circuit coupled to the programmable processor circuit and arranged for storing the program for controlling operation of the videophone apparatus; and a display driver circuit responsive to the programmable processor circuit and configured and arranged to generate video data for a display.

In another embodiment a videophone apparatus with an on-screen infrared remote control keypad user-interface is provided. The apparatus comprises: a video source configured and arranged to capture images and to generate video data representing the images; a POTS interface circuit, configured and arranged to transmit and receive video and audio data over the POTS line; a programmable processor circuit having a first section, including a DSP-type processor, configured and arranged to encode and decode video data, including the video data generated by the video source, and having a controller section, including a RISC-type processor, communicatively coupled to the first section, the controller section configured and arranged to execute a stored program for user controlled operation of the videophone apparatus, display a first menu on the display, the first menu referencing a first plurality of options for operating the videophone apparatus and having associated therewith respective indicators of keypad buttons of the infrared remote control, receive from the remote control keypad a first selection signal indicative of a pressed button, and initiate an operation to control the videophone apparatus in response to the first selection signal; an EEPROM circuit coupled to the programmable processor circuit and arranged for storing the program for controlling operation of the videophone apparatus; and a display driver circuit responsive to the programmable processor circuit and configured and arranged to generate video data for a display.

An on-screen telephone keypad user interface method for a videophone apparatus is provided in another embodiment.

The videophone apparatus includes a video source and a video display coupled to a processor circuit, the processor circuit configured and arranged to execute a program for user controlled operation of the videophone with a telephone keypad coupled to the processor circuit. The method comprises displaying a first menu on the display, the first menu referencing a first plurality of options for operating the videophone apparatus and having associated therewith respective indicators of telephone keypad buttons; receiving from a telephone keypad a first selection signal indicative of a pressed button; and initiating an operation to control the videophone apparatus in response to the first selection signal.

BRIEF DESCRIPTION OF THE DRAWINGS

Other aspects and advantages of the present invention will become apparent upon reading the following detailed description and upon reference to the drawings in which:

FIG. 5 is a block diagram that shows the hierarchical arrangement of a menu system according to an example embodiment of the invention.

Figure 1:
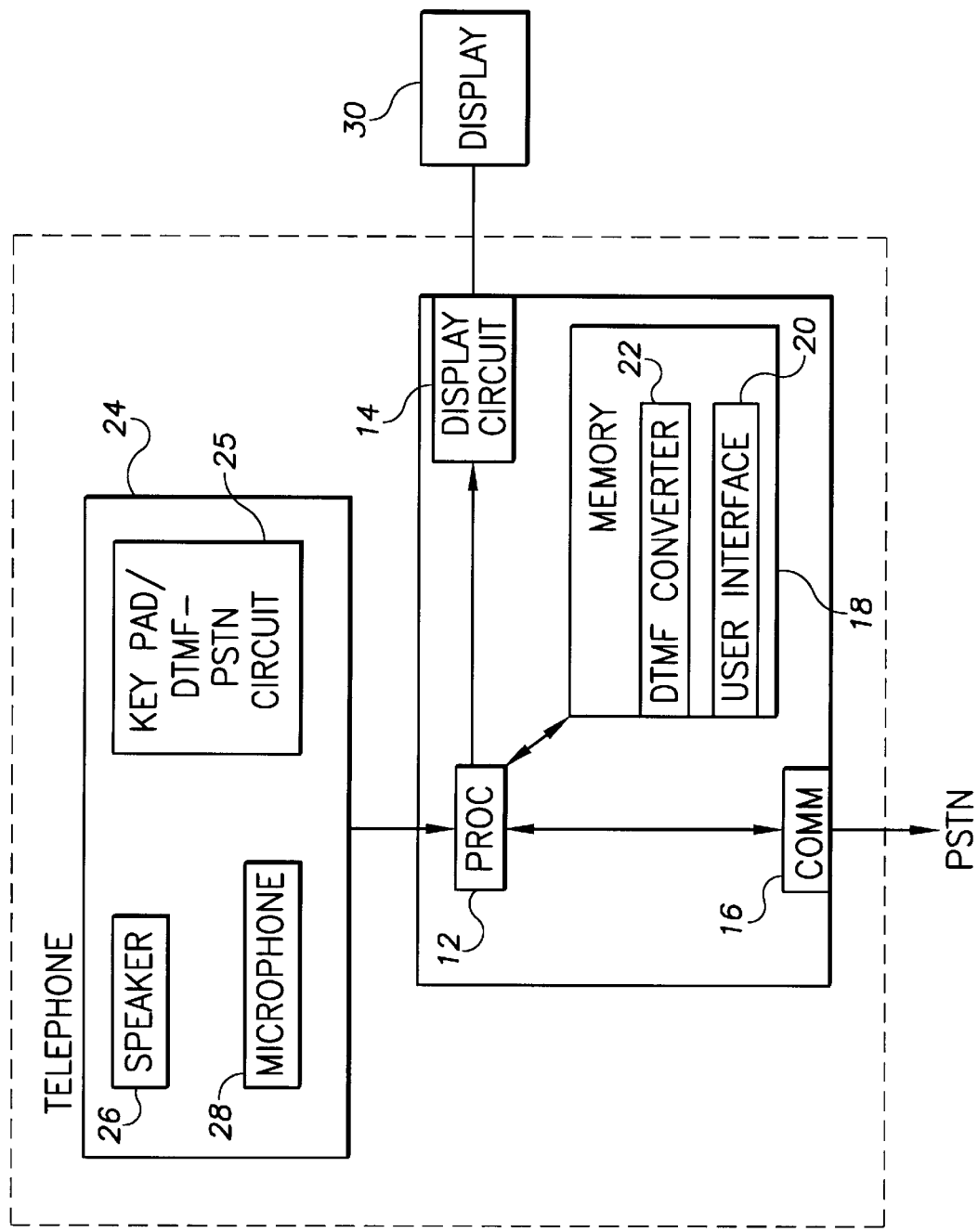
FIG. 1 is a block diagram illustrating an exemplary system in accordance with the principles of the present invention.

While the invention is susceptible to various modifications in alternative forms, specific embodiments thereof have been shown by way of example in the drawings and will herein be described in detail. It should be understood, however, that it is not intended to limit the invention to a particular form disclosed. On the contrary, the invention is to cover all modifications, equivalents, and alternatives falling within the spirit and scope of the invention as defined by the appended claims.

DETAILED DESCRIPTION

The present invention is believed to be applicable to various types of data processing environments in which video information is processed for transmission using a conventional transmission channel. In applications requiring easy to use videoconferencing, such as home-based applications, the present invention has been found to be particularly advantageous in that it is easy to use and readily and inexpensively implemented. An appreciation of the invention may be ascertained through a discussion in the context of an application in which a telephone keypad is used as an input device for the user interface. The figures are used to present such an application.

Turning now to the drawings, FIG. 1 is a block diagram illustrating an example system having a telephone for operating a videophone user interface. The system includes a processor 12, such as a RISC processor, coupled to a display circuit 14 and a communication component 16. Communication component 16 includes hardware along with supporting firmware and/or software, and is included to provide an interface with a communication network, such as a public switched telephone network (PSTN), the internet, local area networks, and/or wide area networks. Display circuit 14 includes hardware along with supporting firmware and/or software and is included to provide an interface with a display 30. Display 30 may be any type of display such as a television, a computer monitor, an LCD display integrated directly into the system, or other functionally similar devices. The display circuit 14 may be, for example, a video card or other circuit suitable for the type of display used.

Processor 12 is further coupled to a memory 18. Under control of the processor 12, software modules, such as a DTMF converter module 22 and a user interface 20 may be loaded from a data storage device into memory 18 of the system for use during actual operations.

The user interface 20 provides, for example, a menu system in which menu options represent and are associated with buttons of a telephone keypad. The buttons of the telephone keypad can be pressed to perform various operations of the videophone.

In an example embodiment, DTMF tones from the keypad 25 of the telephone 24 are used to provide input to the user interface 20. The keys on the input pad 25 when depressed issue a DTMF tone that may be detected and interpreted by DTMF converter module 22 as user interface 20 commands. These commands can be user or product specific. In addition, the key pad assignments can change as desired by loading different conversion (interpretation) protocols into the system.

Figure 2:
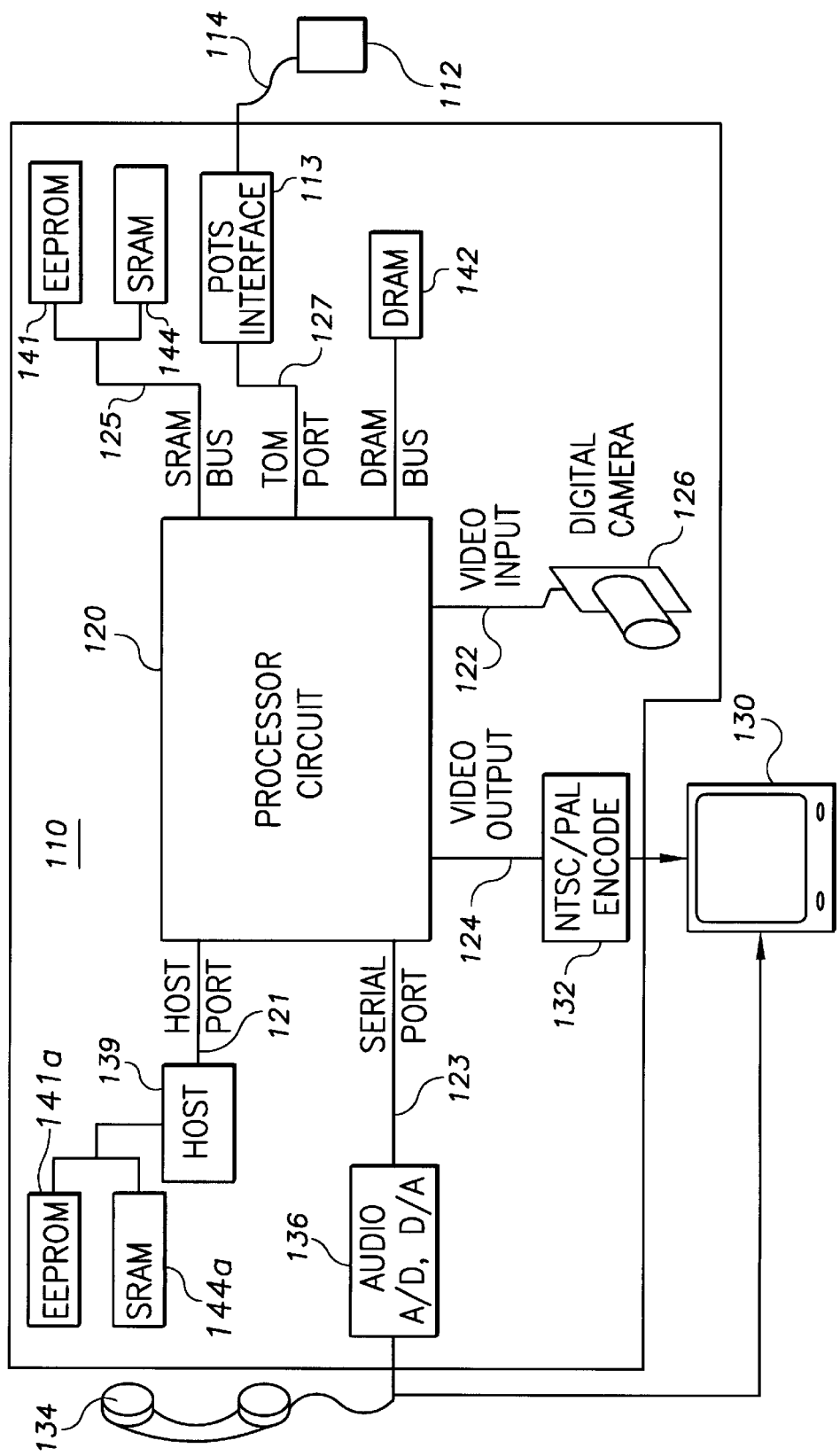
FIG. 2 illustrates an example videophone communication system, according to a particular embodiment of the present invention.

FIG. 2 illustrates an example videophone communication system, according to a particular embodiment of the present invention. The system of FIG. 2 includes a first terminal 110 communicating with a second, similarly-constructed terminal 112. The communication takes place with modem functions provided by processor circuit 120 for transmitting (and receiving) audio and video data over a communications channel 114. In a certain example embodiment, the first terminal 110 is implemented in a manner consistent with one of various set-top box units available from Netergy Networks, Inc. formerly 8×8, Inc. of Santa Clara, Calif. The communications channel 114 can be implemented using a variety of available pathways, including the illustrated POTS (plain old telephone system) phone line (central office not shown), with a POTS interface circuit coupled to the processor circuit 120 and the communications channel 114.

For further information concerning the construction and operation of such set-top units, reference may be made to 8×8' manuals and brochures for models VC100/105, VC50 and VC55 (attached as appendices A through J), and to U.S. Utility Patent Application No. 08/796,909, filed on Feb. 6, 1997 now U.S. Pat. No. 5,934,640, entitled "Device for Mounting and Adjusting a Video Phone and Methods Thereof," and to U.S. Design Patent Application No. 29/072,368, filed Jun. 16, 1997 now U.S. Pat. No. D408,041, entitled "VideoPhone Design," each of which is incorporated herein by reference.

The terminal 110 includes a processor circuit 120 with separate digital video buses 122 and 124 for video input and video output, respectively. The input video bus 122 is used to receive video data from a video source such as a digital camera 126 (illustrated as being internal to the terminal 110). Alternatively, the digital camera 126 can be replaced with an analog camera and an NTSC/PAL decoder, such as the BT827 available from Rockwell Semiconductor Systems and either arrangement can be implemented internal or external to the housing enclosing the processor circuit 110 and its related circuits. The output video bus 124 is used to send video data for display to a monitor 130. Using a television-type monitor, the video data may first be encoded by a NTSC/PAL-type encoder 132, such as the BT866 or BT856 which are also available from Rockwell Semiconductor Systems.

The processor circuit 120 interfaces user audio to a microphone-speaker arrangement 134 through a conventional two-way analog-to-digital converter 136, such as the CS4218 available from Crystal Semiconductor, Inc. In this particular embodiment, the microphone and speaker arrangement 134 is realized using an ordinary telephone. In addition, the audio output is routed to the TV 130 for reproduction over the TV speaker. In one embodiment, the processor circuit 120 is programmed to provide audio compression and decompression. In another embodiment, an audio DSP (digital signal processor) is used between the converter 136 and the processor circuit 120 for compressing and decompressing audio. An example DSP is the AD2181 from Analog Devices, Inc.

The example implementation of FIG. 2 includes different types of memory circuits connected to the processor circuit via the SRAM bus 120. A nonvolatile, electrically-erasable programmable memory 141, such as an EEPROM (including but not limited to flash memories), is used to store program-related data used by the processor circuit 120 to operate the terminal 110. This data includes program data executable by the processor circuit 120, unit-identification data and configuration and set-up data and parameters, such as may be required to interface the terminal 110 with selected Internet servers. A DRAM memory 142 is used to store video and audio data, for instance, in connection with processing for videoconferencing communications. An SRAM memory 144 is used to store executable program-type data, frequently-used data and stack data for general-purpose processing tasks. The SRAM is also used to store buffers of compressed video and audio data and input/output (I/O) data transferred via the serial port 123 and host port 121 to external devices.

In an example embodiment, the POTS interface circuit 113 detects a country code signal on communication channel 114 and provides it to processor circuit 120. In response thereto, processor circuit 120 selects the language in which user interface data is presented on television 130. For example, processor circuit 120 can be programmed to use objects that are nationalized and associated with the different country codes, for example, menu objects.

In other embodiments, a host controller 139 is coupled to the processor circuit 120 via a host interface port, and is used to provide overall control to the terminal 110. The host controller handles tasks such as call control, user interface, handshaking with the remote terminal and multiplexing of compressed audio and video data received from the processor circuit 120. The host controller uses external non-volatile memory such as EEPROM 141a to store programs for both itself and the processor circuit 120. These programs may be changed during a download process from a server, as is subsequently discussed. The host controller 139 also uses its own SRAM 144a to run the host programs. In this embodiment, the processor circuit 120 does not require its own EEPROM 141 since the host controller 139 can load its programs through the host port, and it uses a smaller SRAM 144 since the SRAM 144a is used for part of the program. The host processor can be implemented as any of a variety of commercially available general-purpose processor circuits, such as the 68302 available from Motorola, Inc.

Using a conventional DTMF-type telephone as the microphone-speaker arrangement 134, a user can also enter commands for controlling the operation of the videophone apparatus by depressing the keys on the telephone. For a discussion of example types of key-input commands that may be used to control terminal 110, reference may be to U.S. patent application No. 08/706,486, filed on Sep. 4, 1996, entitled, "Telephone Web Browser Arrangement and Method" now U.S. Pat. No. 5,761,280, and No. 08/861,619, filed on May 22, 1997, entitled, "Arrangement for Controlling the View Area Of a Video Conferencing De vice and Method Therefor".

In another embodiment (not shown), the digital camera 126 of FIG. 2 can be replaced by an external video source such as a camcorder which connects to an STB unit, implemented as an NTSC/PAL decoder. Such a decoder converts the camcorder video signal into a digital form suitable for interface to the video input of the processor circuit 120. This embodiment is consistent with the VC50 STB from Netergy Networks, Inc., formerly 8×8, Inc., as illustrated and described in VC50 Users manual (attached to this filing and incorporated herein as Appendix A).

Another embodiment (not shown), according to the present invention, includes an STB unit that transmits over an ISDN digital line rather than over a POTS line. In this embodiment, the compressed audio and video data are transmitted from the processor circuit 12 via a TDM serial port 127 to an ISDN interface circuit (not shown), which connects directly to the ISDN line. ISDN interface circuits are commercially available, for example, from Siemens Corp. This configuration may be used in three modes. In the first mode, the processor circuit 120 implements the H.320 videoconferencing standard, which is normally used on ISDN lines. Audio compression and decompression may be programmed functions performed by processor circuit 120, or alternatively by a separate DSP. A typical H.320 call operates at a data rate of 128 blips. In the second mode, the processor circuit 120 implements the H.324 standard, which is normally used for POTS lines. In this mode, known as "~H.324-over-ISDN~" V.34 modem specified by the H.324 standard is implemented as a programmed function of the processor circuit 120. The remainder of the H.324 standard (including audio compression and decompression) is also implemented on the processor circuit 120. The V.34 data stream generated by the processor circuit 120 is transmitted over the ISDN line. This configuration allows the ISDN terminal of FIG. 1 to communicate with POTS terminals using a central office to perform the digital-to-analog conversion from ISDN to POTS. The third mode supported by an ISDN terminal is known as "H.324/I" and is standardized as part of the H.324 standard, annex D (to be adopted by the ITU in Jan. 1998), is similar to the second mode except that the V.34 modem is completely eliminated. In this mode the processor circuit 120 implements the H.324 standard, including audio and video compression. The compressed audio and video data are mixed and then transmitted directly on the ISDN line digitally without any modulation. This mode allows two ISDN terminals to communicate using H.324/I which is considered by many skilled in the art to be a superior standard to H.320. Accordingly, a single ISDN terminal can operate in H.320, H.324-over-ISDN, and H.324/I modes, thus allowing interoperability with a wide range of remote terminals.

In another example embodiment, the arrangements of FIGS. 1 and 2 are configured with the features of a VC55 type ViaTV Phone arrangement and with an infrared remote control keypad coupled to the processor circuit 120 using an infrared transmitter/receiver arrangement. Using the VC55 or a similarly constructed device that does not include an integrated internal infrared receiver, an external infrared receiver for the keypad can be coupled into the auxiliary expansion port, using, for example, a receiver available from Sejin Electron, Inc.

Figure 3:
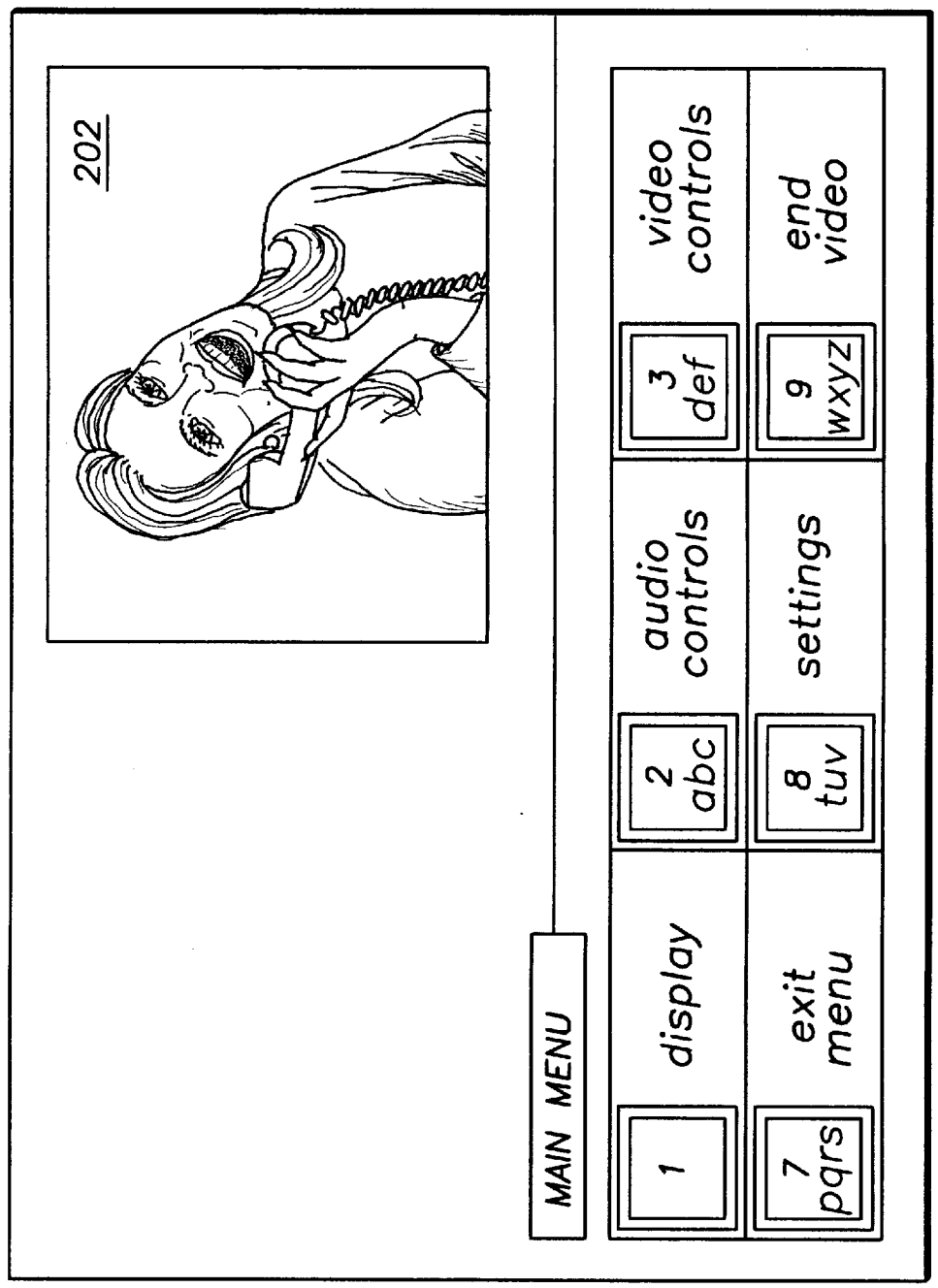
FIG. 3 illustrates user interface data presented in accordance with various embodiments of the invention.
Figure 4:
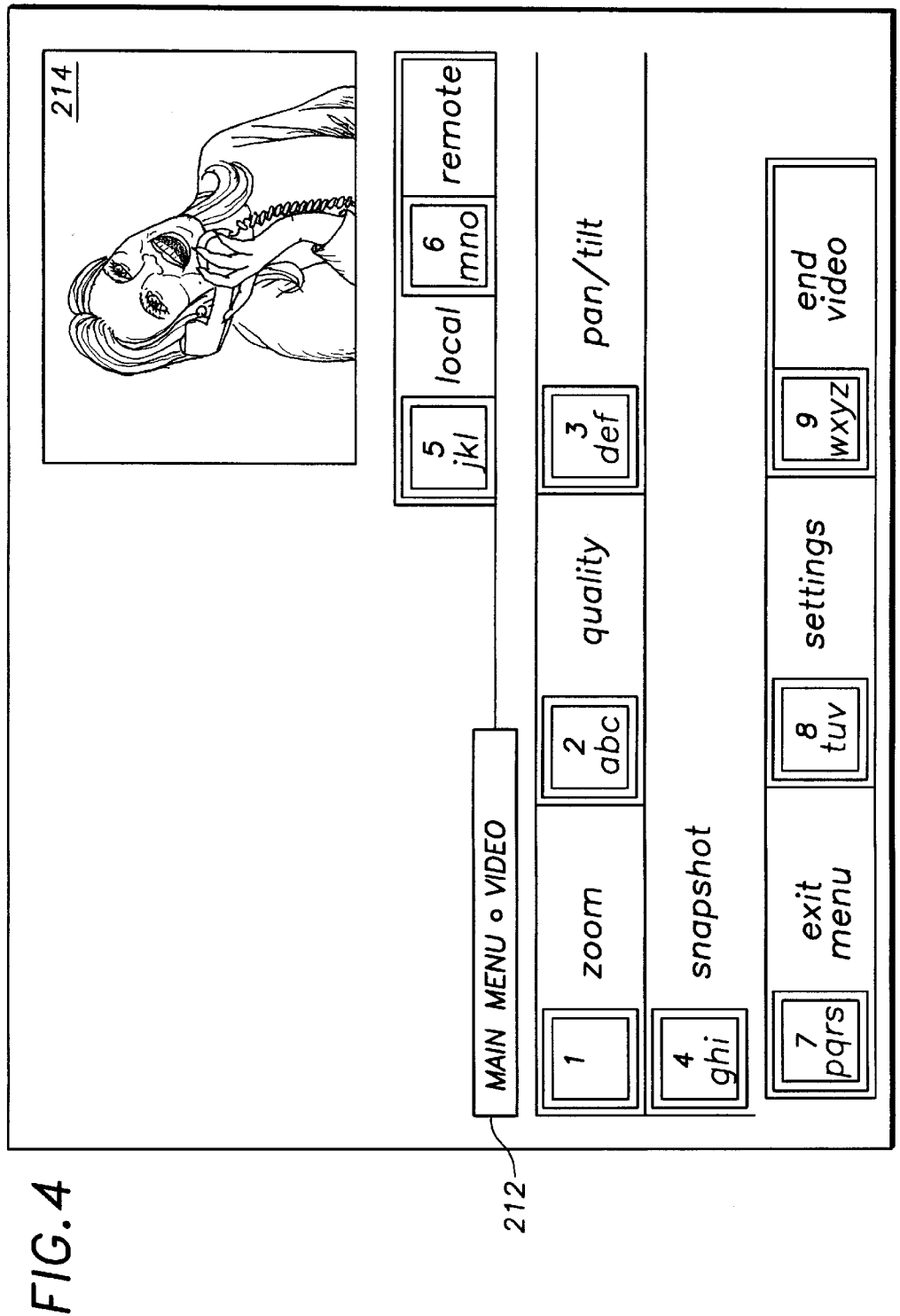
FIG. 4 illustrates additional user interface data presented for additional example embodiments of the invention.

FIGS. 3 and 4 together illustrate various example characteristics of the user interface provided by the user interface module 20. FIG. 3 illustrates a screen-dump of a display in which video images and various videophone menu controls are displayed. The video images are displayed in a first portion 202 of the screen, and the menu options are displayed below the video images.

The menu includes a plurality of telephone keypad indicators labeled 1, 2, 3, 7, 8, and 9, to represent the corresponding buttons of a telephone key pad 25. It will be appreciated that as with actual telephone keypad buttons, indicators 2, 3, 7, 8, and 9 have letters of the alphabet associated therewith.

Along with the indicators is a labeled function for operating the video phone. For example, indicator 1 is associated with a display function, indicator 2 is associated with audio control functions, indicator 3 is associated with video control functions, indicator 7 is associated with a function to exit the menu, indicator 8 is associated with functions for adjusting various settings of the videophone, and indicator 9 is associated with ending the videoconference session.

In an example embodiment, selection of button 3 on telephone key pad 25 results indicator 3 being highlighted, and also leads to the video control menu illustrated in FIG. 4.

FIG. 4 illustrates a screen dump of a display of a sub-menu of the main menu depicted in FIG. 3, along with video images. It will be appreciated that a context data 212 is provided to assist a user in navigating the menu hierarchy, which is discussed in further detail later herein. In this example, the video controls menu is displayed. The detailed functions for controlling operation of the videophone as depicted in FIG. 4 are described in detail in the attached appendices. To accommodate the additional level of menu information, in particular, the indicators 1, 2, 3, and 4, along with indicators 5 and 6, the size of the video images 214 is reduced (as compared to FIG. 3). The reduced size allows a user to continue to view the video images without obstruction while various videophone settings are being adjusted.

FIG. 5 is a block diagram that illustrates a hierarchical arrangement of a menu system according to an example embodiment of the invention. To illustrate various aspects of the invention, selected ones of the blocks in the hierarchy are illustrated in further detail in FIGS. 6A–6JJ. FIGS. 6A–6JJ illustrate in block form the layout of data presented on display circuit 30, as compared to the screen dump data format depicted in FIGS. 3 and 4. It will also be appreciated that the functions referenced in the menus of FIGS. 6A–6JJ are described in the attached appendices. The functional description is not repeated in the main body of this specification. Note that the attached appendices illustrate another embodiment of a menu system for controlling a videophone system with a telephone keypad.

Figure 6A:
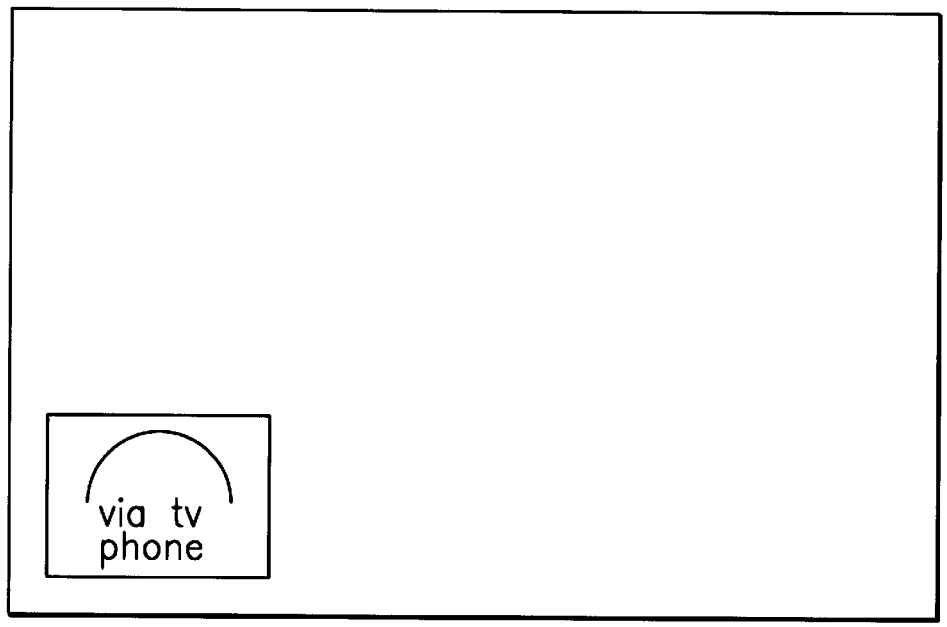
FIGS. 6A, 6B, 6C, 6D, 6E, 6F, 6G, 6H, 6I, 6J, 6K, 6L, 6M, 6N, 6O, 6P, 6Q, 6R, 6S, 6T, 6U, 6V, 6W, 6X, 6Y, 6Z, 6AA, 6BB, 6CC, 6DD, 6EE, 6FF, 6GG, 6HH, 6II, and 6JJ are block diagrams that show the content and layout of the menus within the hierarchy illustrated in FIG. 5.
Figure 6B:
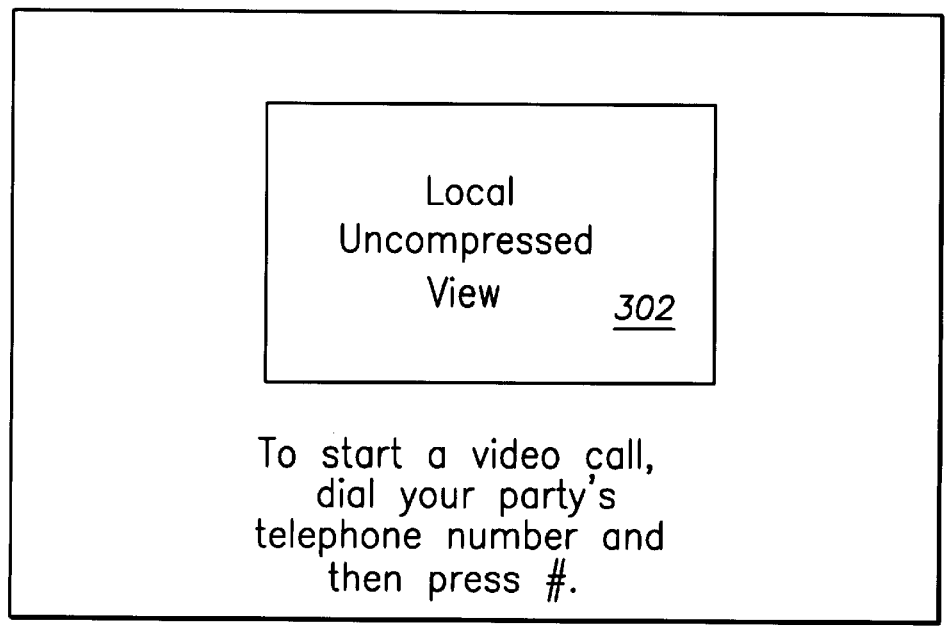
Figure 6C:
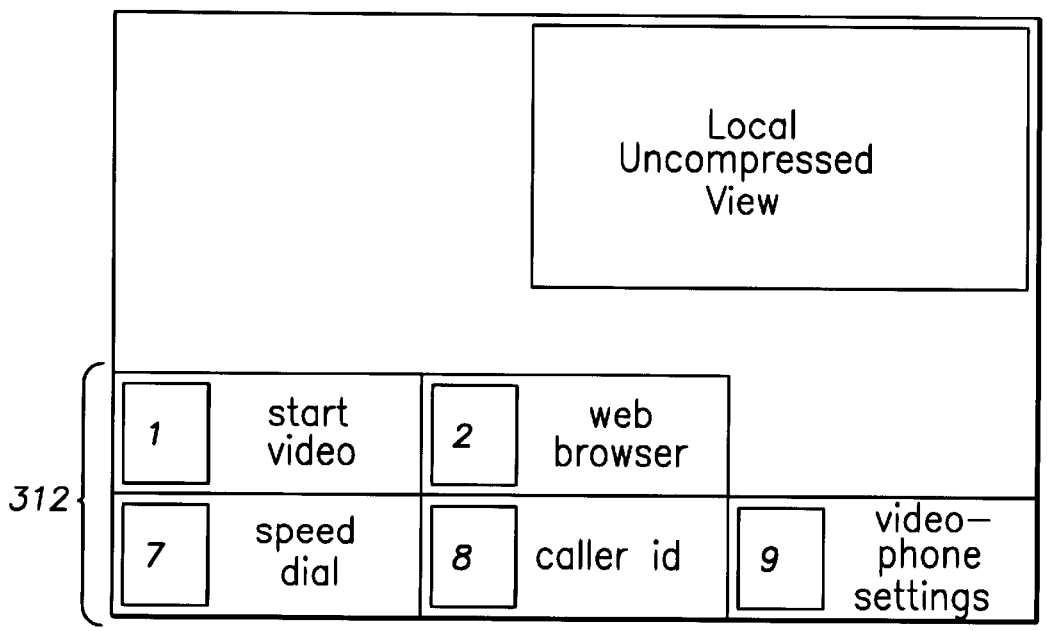

FIGS. 6A, 6B, and 6C illustrate start-up screens displayed in establishing a videoconference. In FIG. 6A, the videophone system displays an example screen saver image, and in FIG. 6B, video images presented at example video input port 122 (see FIG. 2) are displayed in block 302. Instructions are provided to a user in the screen of FIG. 6B for starting the videoconference. In the FIGS. 6A–6JJ, where a block in which video images are displayed is labeled Local Uncompressed View, this indicates a self-view used for convenient camera positioning; where the block is labeled Local View, this indicates that images from a local source are displayed; and where the block is labeled Local or Remote View, this indicates that the user can select whether images from a local site or images from a remote site are displayed.

FIG. 6C illustrates the pre-call menu 312 according to an example embodiment of the invention. As shown in the hierarchy of FIG. 5 and illustrated by the menu options, menu 312 includes menu options for starting a videoconference (indicator 1), starting a web browser (indicator 2), speed dialing another party (indicator 7), a caller-id function (indicator 8), and functions for adjusting settings of the videophone (indicator 9). Operation of the web browser with a telephone keypad is described in the above-referenced patent applications and is not repeated herein.

Figure 6D:
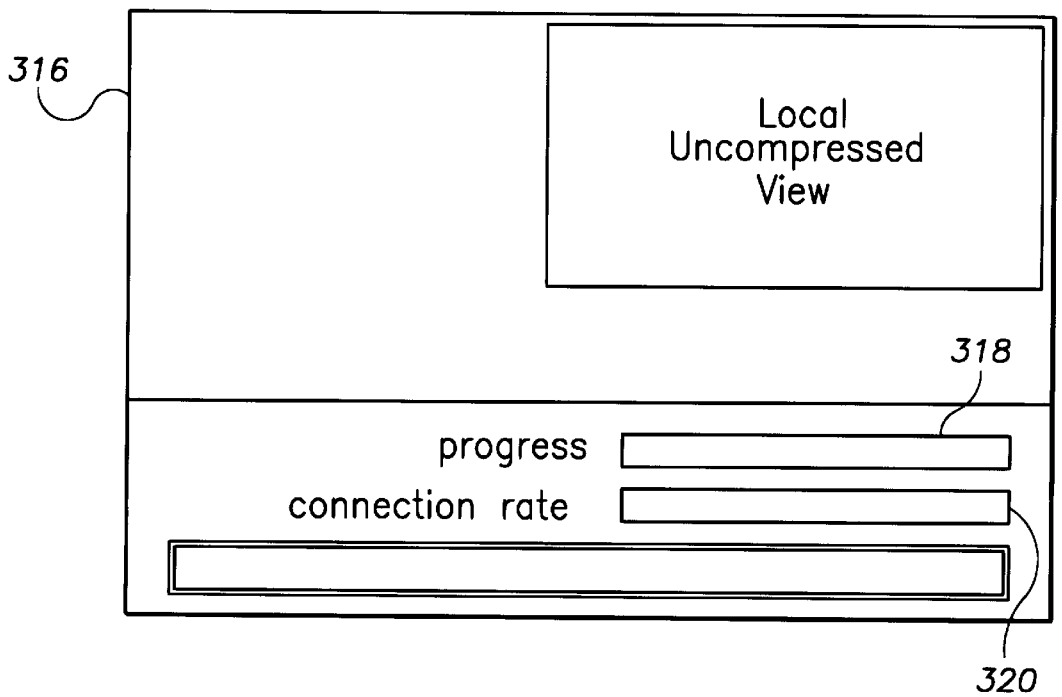

Selection of the start video function (indicator 1) causes the videophone system to display the connection screen shown in FIG. 6D. The connection screen 316 includes a progress indicator 318 and a connection rate indicator 320. The progress indicator can be either a bar whose size illustrates approximately how much time remains to establish the videoconference or a percentage completion. The connection rate indicator indicates the rate at which data will be transferred between sites of the videoconference.

Figure 6E:
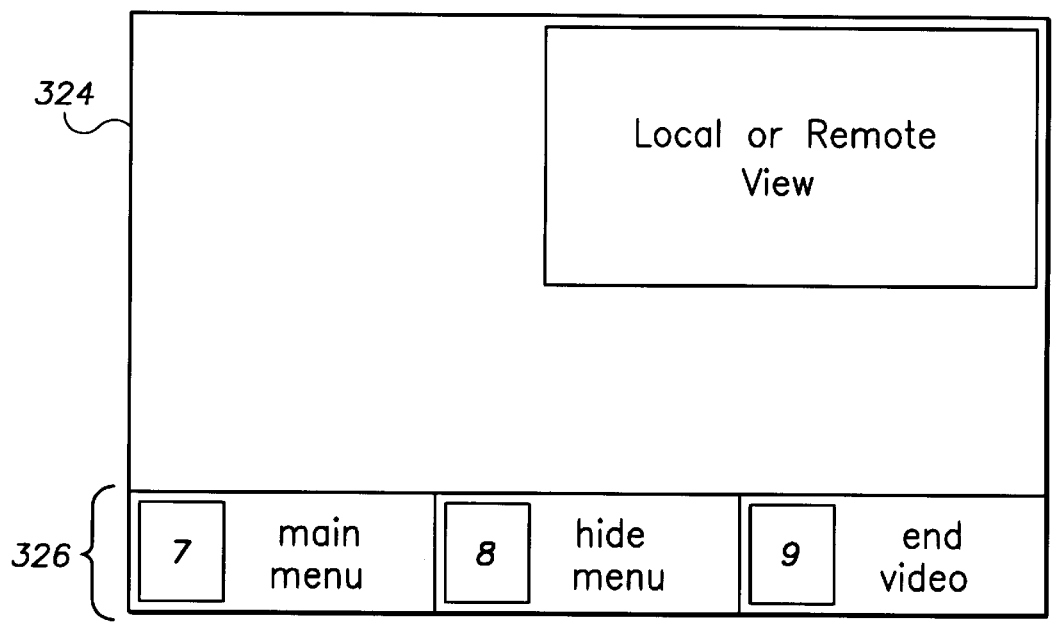
Figure 6F:
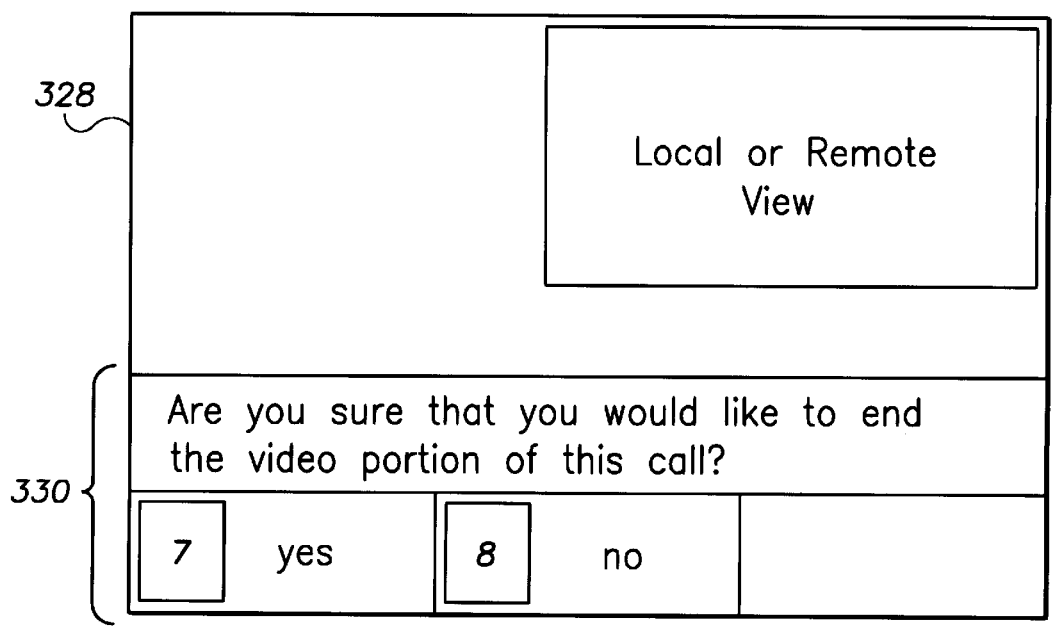

When a videoconference connection is complete, the videophone system displays screen 324 of FIG. 6E. Screen 324 includes the call menu 326 whose options include a main menu option (indicator 7), a hide menu option (indicator 8), and an end video option (indicator 9). FIG. 6F illustrates a screen 328 that includes the end video menu 330. The end video menu 330 includes verification options for affirming termination of the videoconference (indicator 7) or continuing the videoconference (indicator 8).

Referring now back to FIG. 5, another sub-menu under the call menu of FIG. 6E is the main menu. Recall that main menu was described in the screen dump of FIG. 3, and therefore, is not also shown as a block diagram.

Figure 6G:
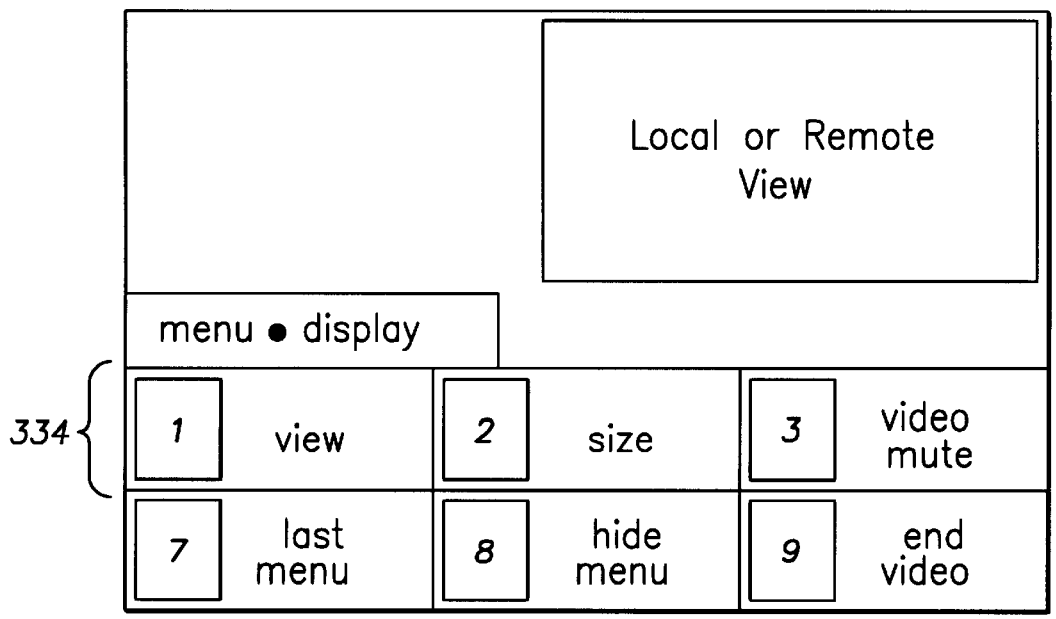

A first sub-menu of the main menu is the display menu. FIG. 6G is a block diagram of the layout of the display menu 334. The display menu includes a view option (indicator 1) for selecting between local and remote video images, a size option (indicator 2) for selecting the size for the displayed video images, and a video mute option (indicator 3) for suppressing transmission of video images captured at the local site.

Figure 6H:
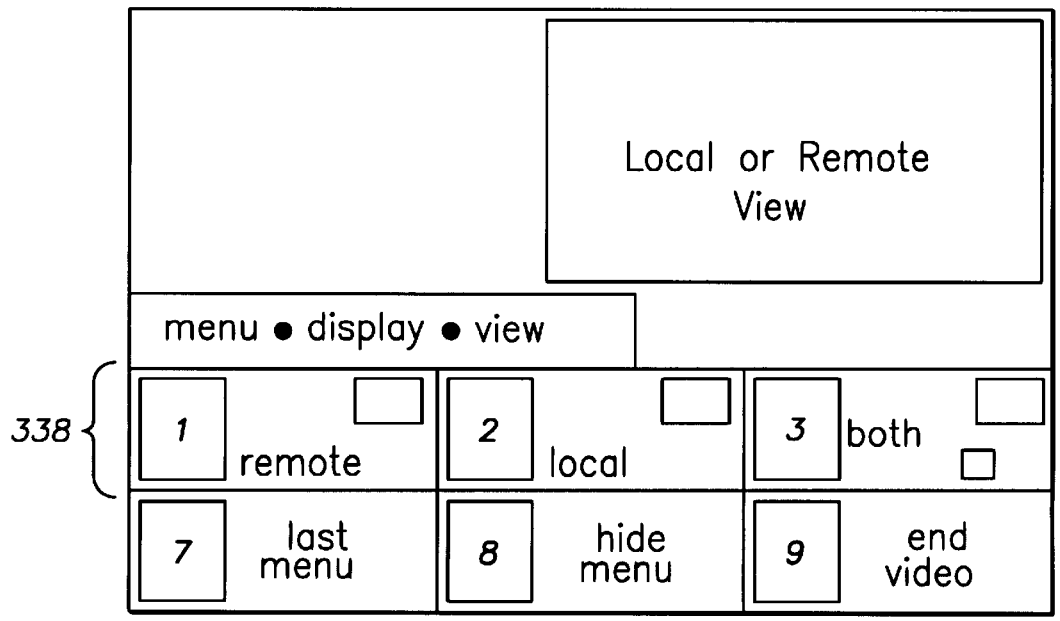

The view menu is a sub-menu of the display menu 334 of FIG. 6G. FIG. 6H is a block diagram that shows the layout and content of the view menu 338. The view menu 338 includes a remote option (indicator 1) for selecting display of video images from a remote site of a video conference, a local option (indicator 2) for selecting display of images from a local site of a video conference, and a both option (indicator 3 for selecting display of images from both the local and remote sites.

Figure 6I:
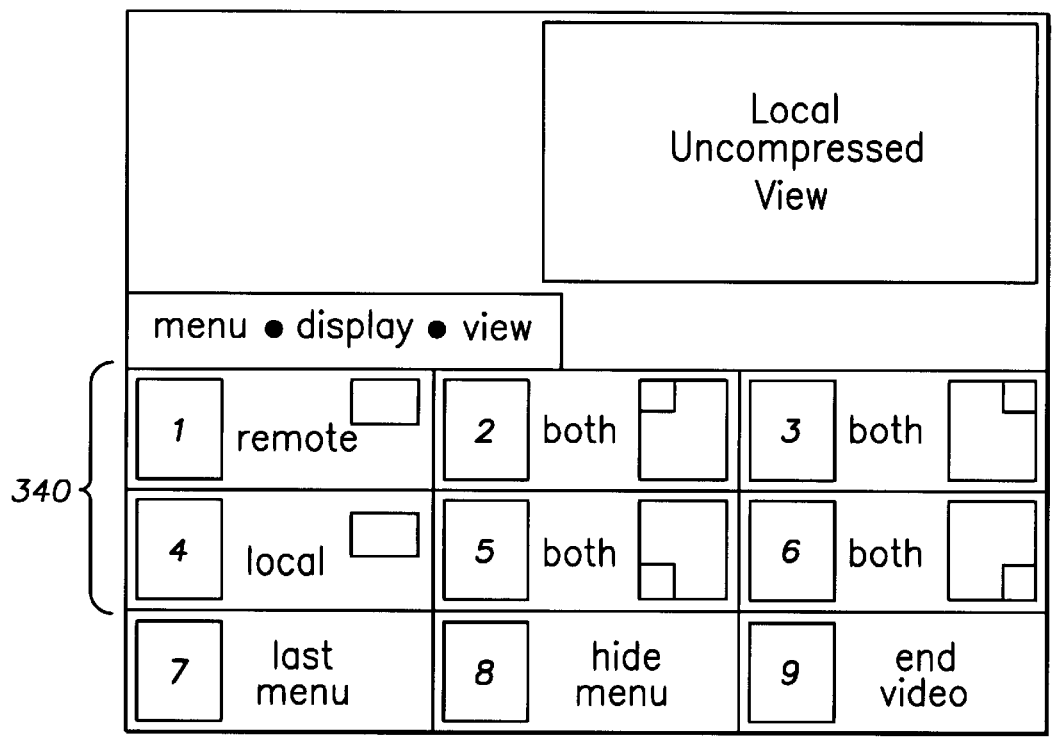

FIG. 6I is another example embodiment of a view menu 340. The display menu 340 includes a remote option (indicator 1) and a location option (indicator 4) similar to that of view menu 338. However, view menu 340 also includes option for picture-in-picture placement of local and remote views as illustrated by indicators 2, 3, 5, and 6.

Figure 6J:
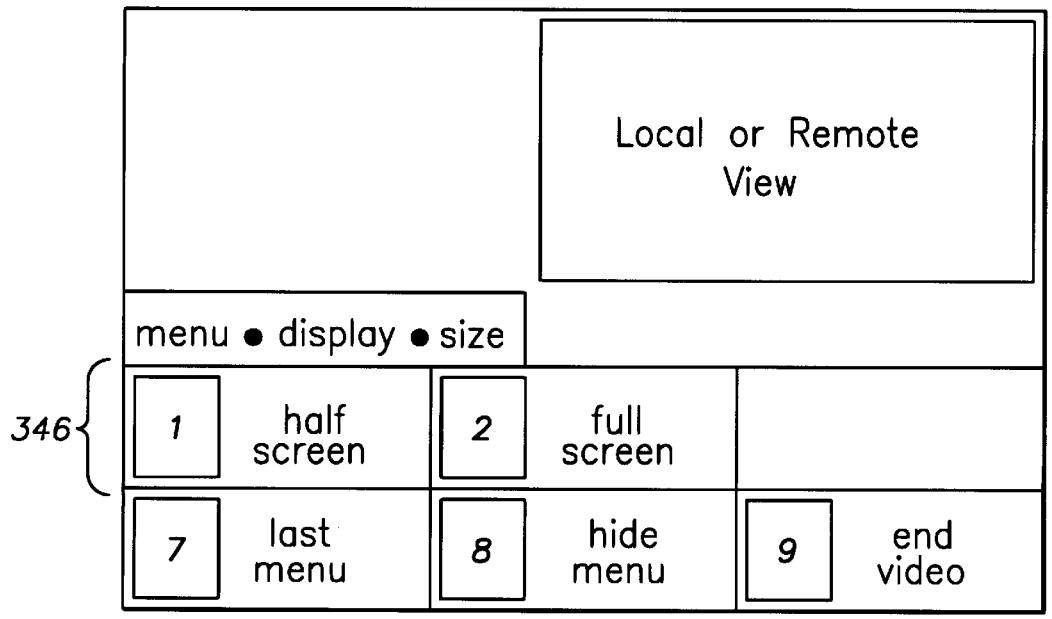

The size menu is also a sub-menu of the display menu 334 of FIG. 6G. FIG. 6J is a block diagram that shows the layout and content of the size menu 346. The size menu 346 includes a half screen option (indicator 1) for displaying video images using half the display screen, and a full screen option (indicator 2) for displaying video images using the full display screen.

Figure 6K:
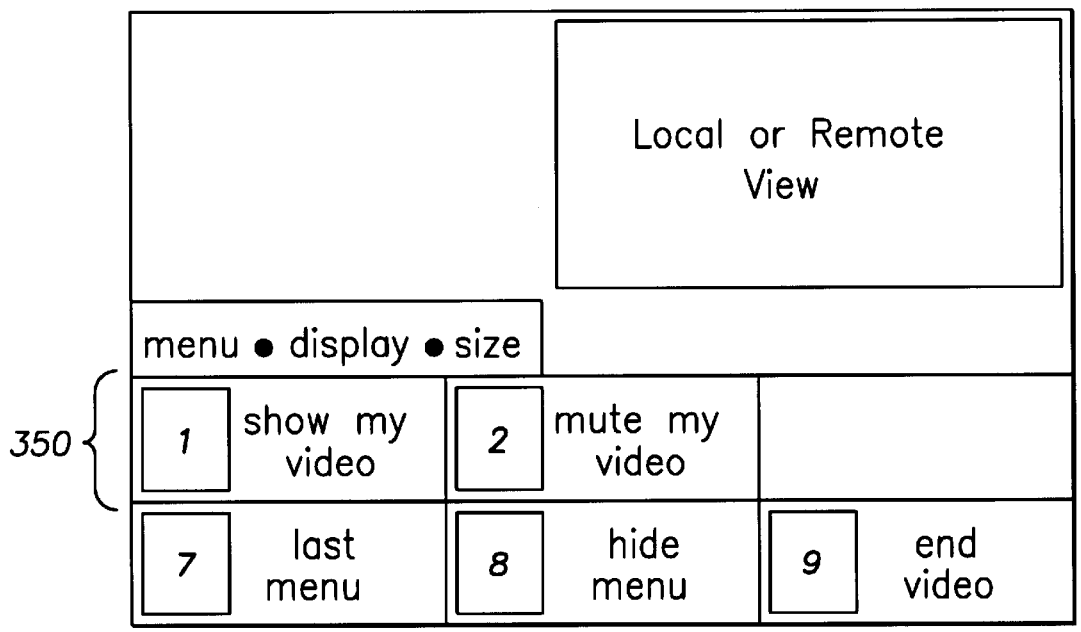

The last sub-menu of the display menu 334 is the video mute menu. FIG. 6K is a block diagram that shows the layout and content of the video mute menu 350. The video mute menu 350 includes a "show my video" option (indicator 1) for selecting transmission of video images from the local site to a remote site, and a "mute my video" option (indicator 2) for suppressing transmission of the video images from the local site to a remote site.

Figure 6L:
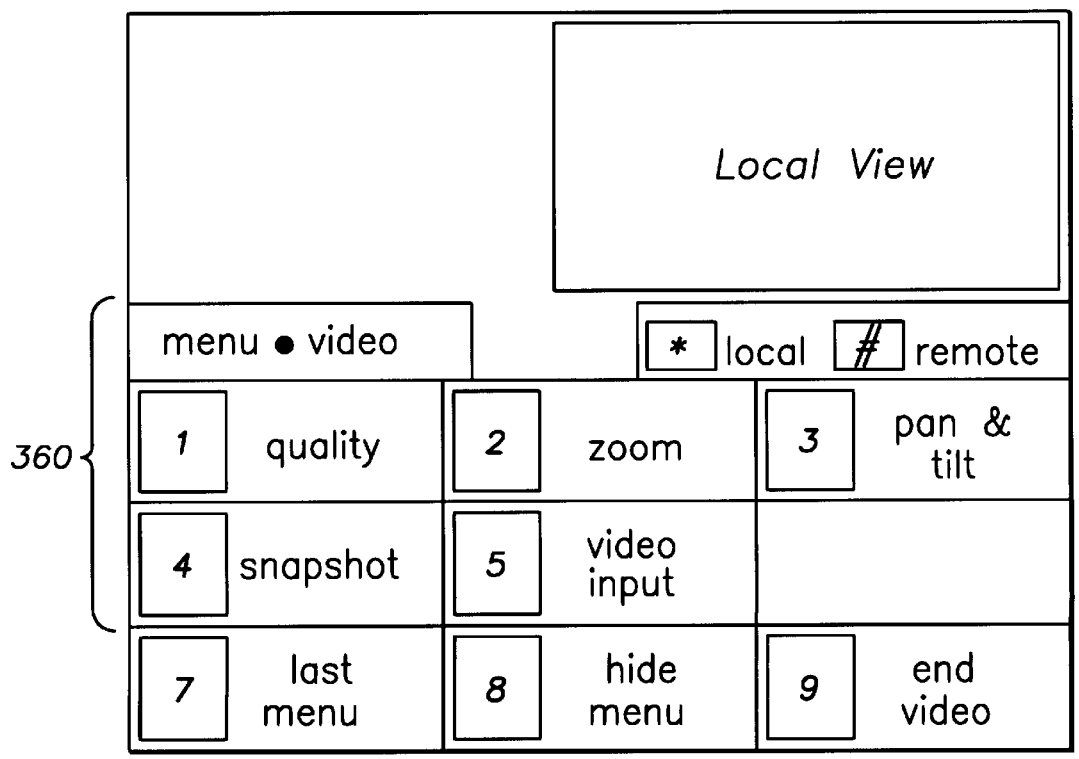

Returning now to the main menu illustrated in FIG. 3, the video controls menu is a sub-menu of the main menu. FIG. 6L is a block diagram that shows the content and layout of the video controls menu 360. Five video control options are available to control both a local camera and a remote camera. The options include a quality option (indicator 1) to adjust the quality of video images, a zoom option (indicator 2) for adjusting telephoto settings of a camera, a pan & tilt option (indicator 3) to directing movement of a camera, a snapshot option (indicator 4) for capturing and transmitting still images, and a video input option (indicator 5) for selecting a source of video images for transmission. The option for adjusting video settings of the local videophone system is shown as the "*" indicator, and the option for adjusting settings of the remote videophone system is shown as the "#" indicator. To adjust local video settings, a user first pushes the "*" button on the telephone key pad 25 and then selects one of buttons 1–5 according to the desired adjustment and associated indicator.

Figure 6M:
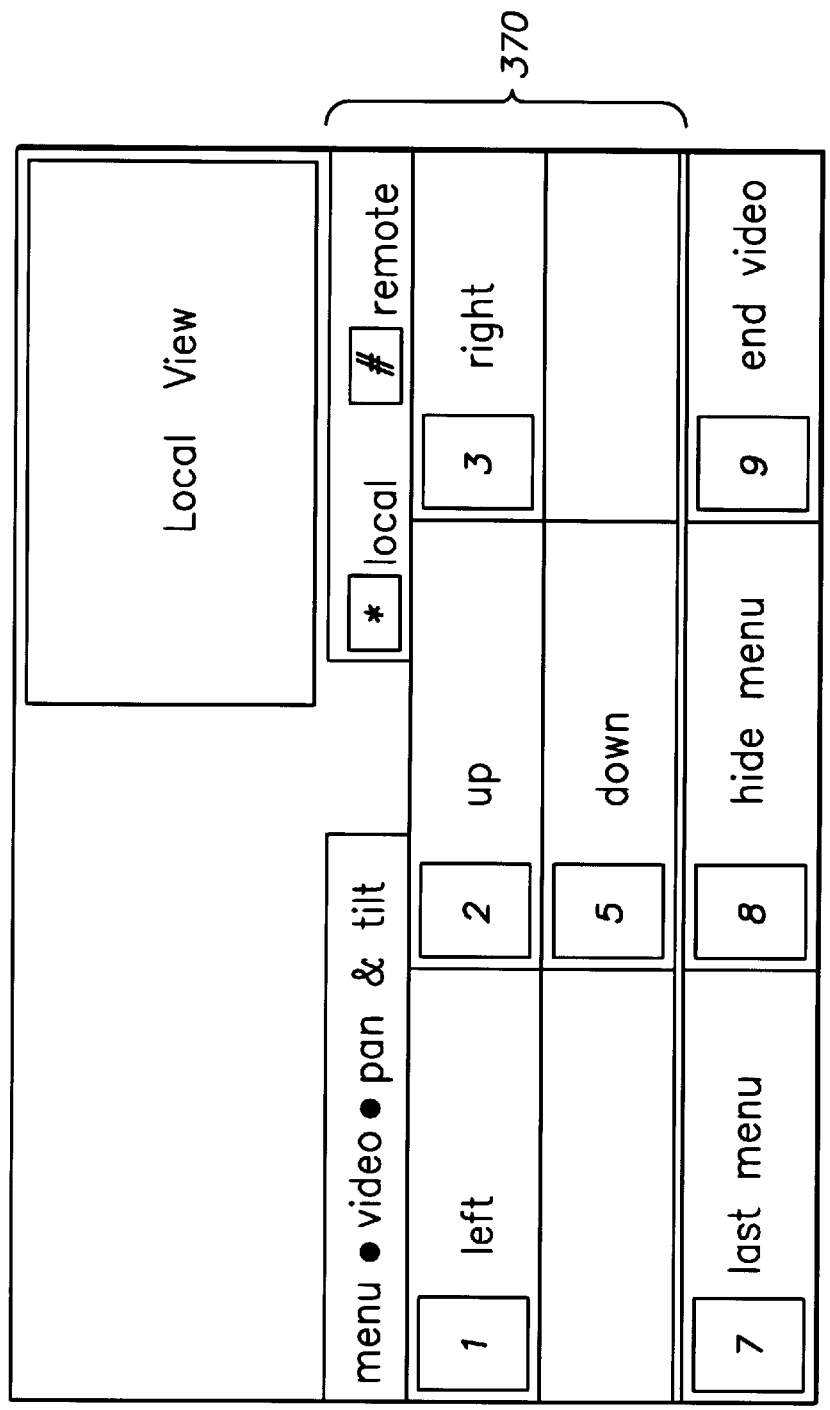

FIG. 6M is a block diagram that shows the layout and content of the pan & tilt menu 370 which is a sub-menu of the video controls menu 360. The pan & tilt menu 370 includes a left option (indicator 1) for moving a camera left, an up option (indicator 2) for moving a camera up, a right option (indicator 3) for moving a camera right, and a down option (indicator 5) for moving a camera down. The local option (indicator *) and the remote option (indicator #) are available as with the video controls menu 360.

Figure 6N:
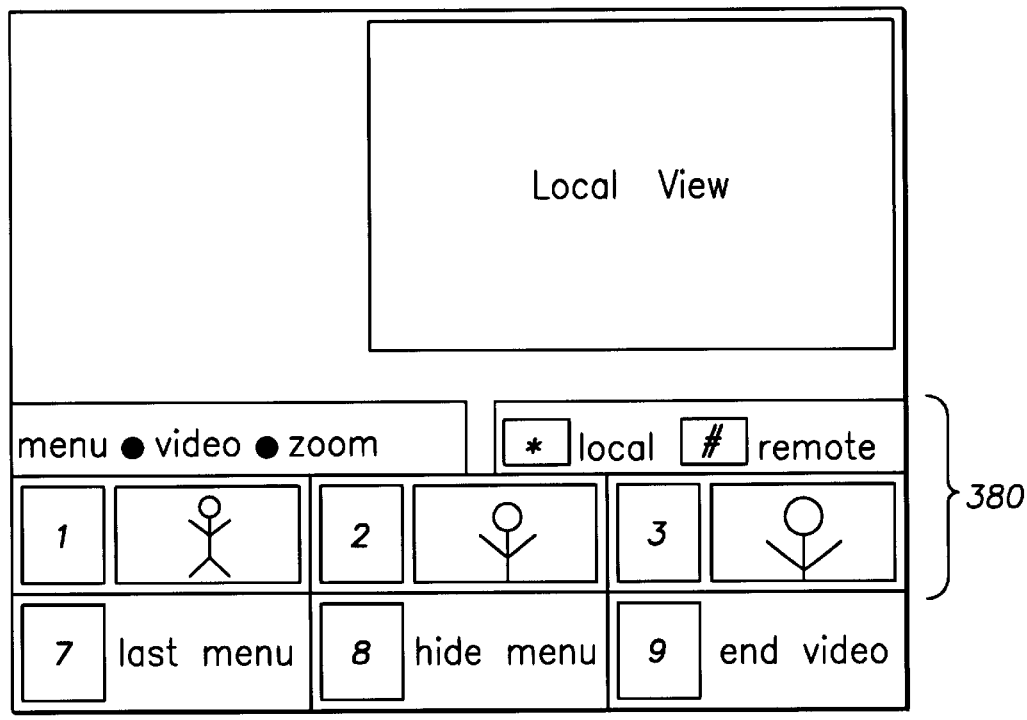

FIG. 6N is a block diagram that shows the layout and content of the zoom menu 380 which is a sub-menu of the video controls menu 360. The zoom menu 380 includes a wide-angle option (indicator 1) for a wide-angle camera image, a normal-angle option (indicator 2) for a standard angle camera image, and a telephoto option (indicator 3) for a telephoto angle camera image. The local option (indicator *) and the remote option (indicator #) are available as with the video controls menu 360.

Figure 6O:
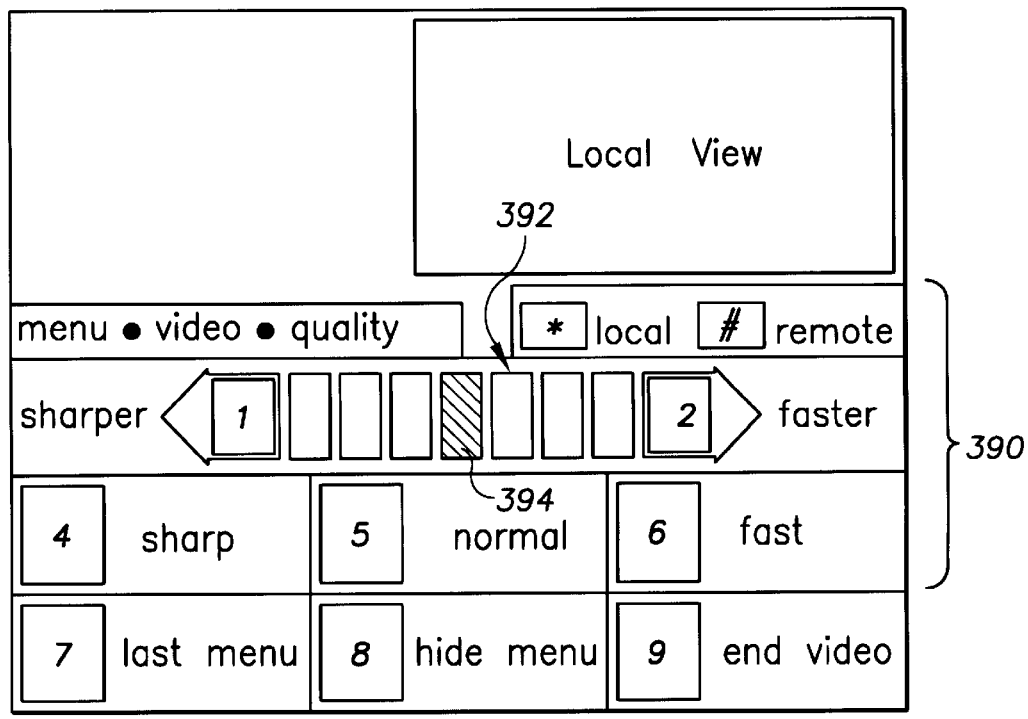

FIG. 6O is a block diagram that shows the layout and content of the quality menu 390 which is a sub-menu of the video controls menu 360. The quality menu 390 includes a scale 392 that includes adjustment options (indicators 1 and 2). The scale 392 shows the user the relative relationship between the level of detail in coded video images and the frame rate. For example, a greater the frame rate corresponds to a lesser level of detail in the coded video images. Similarly, a greater level of detail in the coded video images results in a reduced frame rate. A sharper option (indicator 1) is available to increase the level of detail in the coded video images and decrease the frame rate. Pressing the 1-button on the telephone keypad 25 causes an increase in the level of detail in the coded video images and a decrease in the frame rate. The opposite is true for the 2-button on the keypad 25. The shaded block 394 within the scale 392 indicates a present relationship between the level of detail in the coded video images and the frame rate. In an example embodiment, pressing the 1-button once decreases the frame rate by two frames per second, which results in a corresponding change in the quantization limit and an increase in the resolution, in accordance with the H.320 and H.324 standards. The sharp option (indicator 4) is available to provide the highest level of detail in the coded images that is supported by the videophone system, and a corresponding lowest supported frame rate. Similarly, the fast option (indicator 6) is available to provide the highest frame rate that is supported and a corresponding lowest level of detail. The normal option (indicator 5) is available to select a midrange setting between the level of detail and the frame rate.

Figure 6P:
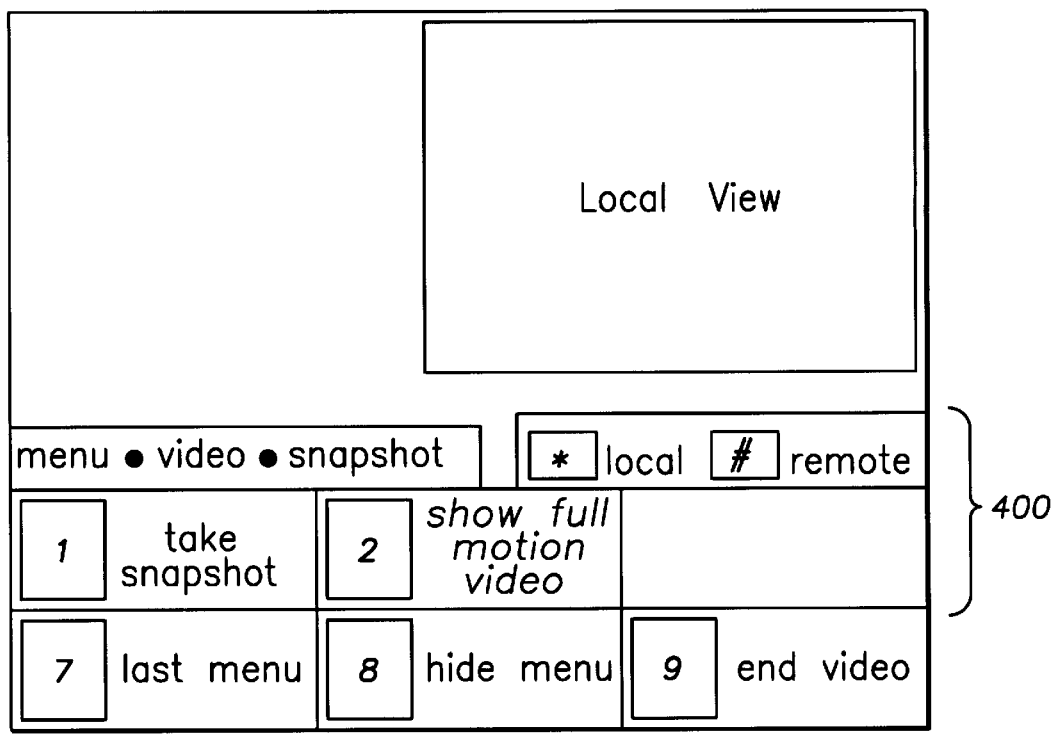

FIG. 6P is a block diagram that shows the layout and content of the snapshot menu 400 which is a sub-menu of the video controls menu 360. The snapshot menu 400 includes a snapshot option (indicator 1) for selecting a still image view from a camera, and a full motion option (indicator 2) for selecting full motion video images from a camera.

Figure 6Q:
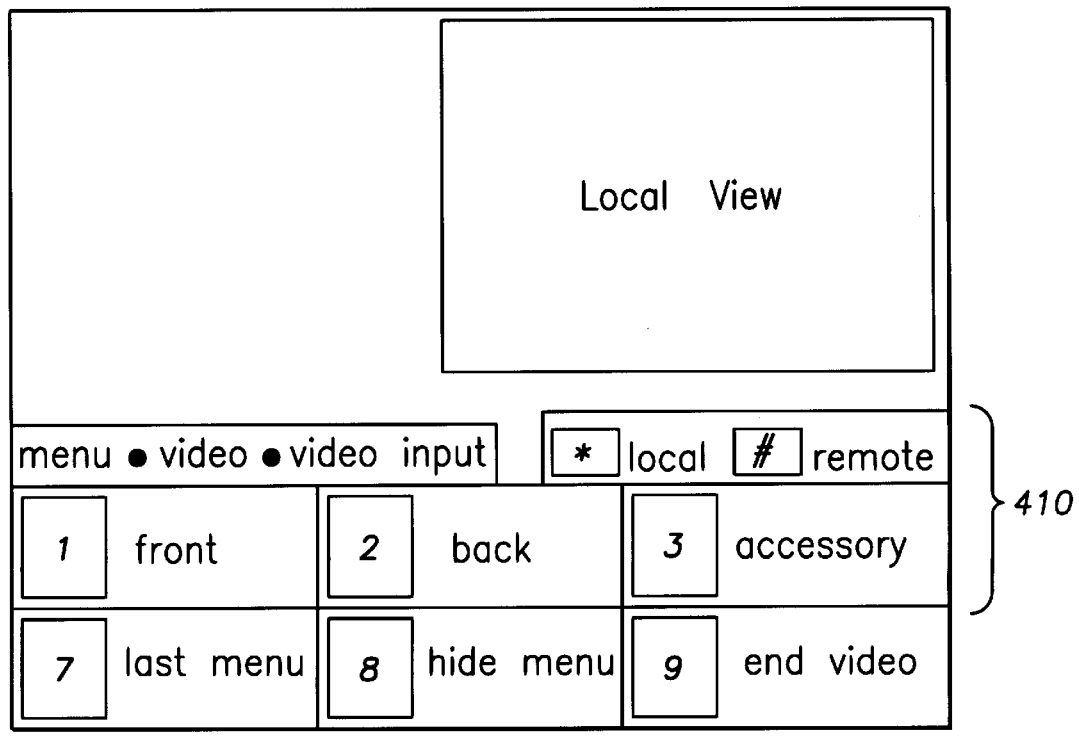

FIG. 6Q is a block diagram that shows the layout and content of the video input menu 410 which is a sub-menu of the video controls menu 360. The video input menu includes a front option (indicator 1) for selecting video images from a first source at the videophone system (either the local or remote system), a back option (indicator 2) for selecting video images from a second source at the videophone system (either the local or remote system), and an accessory option (indicator 3) for selecting video images from a third source at the videophone system (either the local or remote system).

Figure 6R:
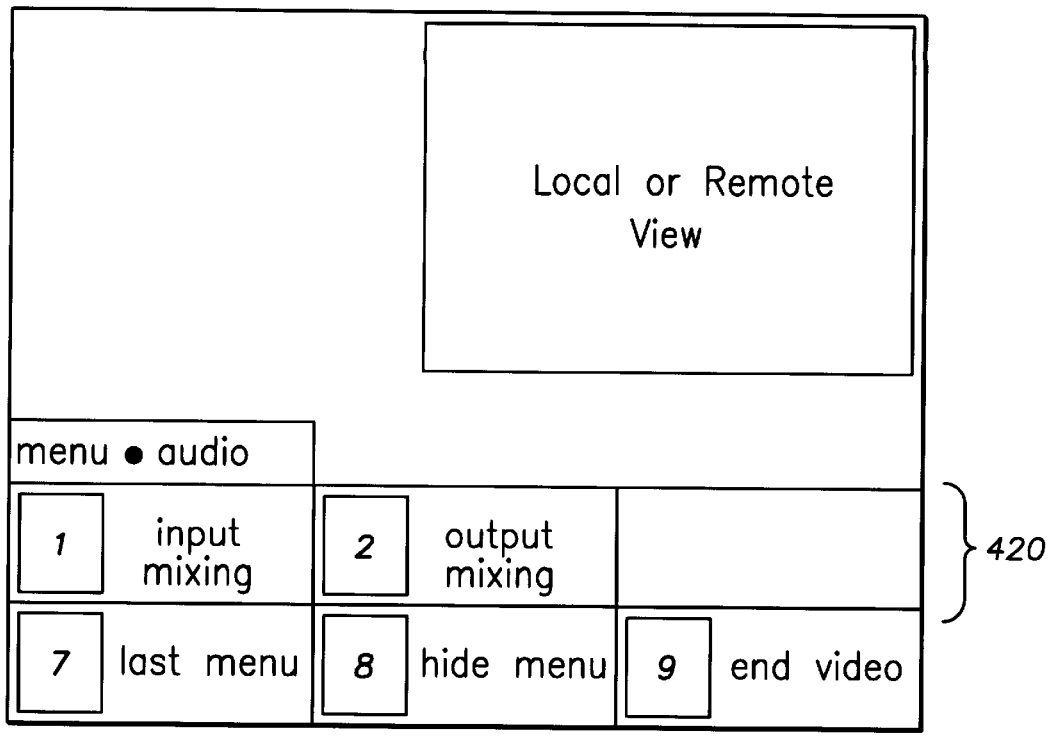

Returning now to the main menu of FIG. 3, the main menu includes an audio controls sub-menu. FIG. 6R is a block diagram that shows the layout and content of the audio controls menu 420. The audio controls menu includes an input mixing option (indicator 1) for mixing audio signals that are input to a videophone system, such as a telephone and a taped audio input, and an output mixing option (indicator 2) for mixing audio signals that are output, such as for recording.

Figure 6S:
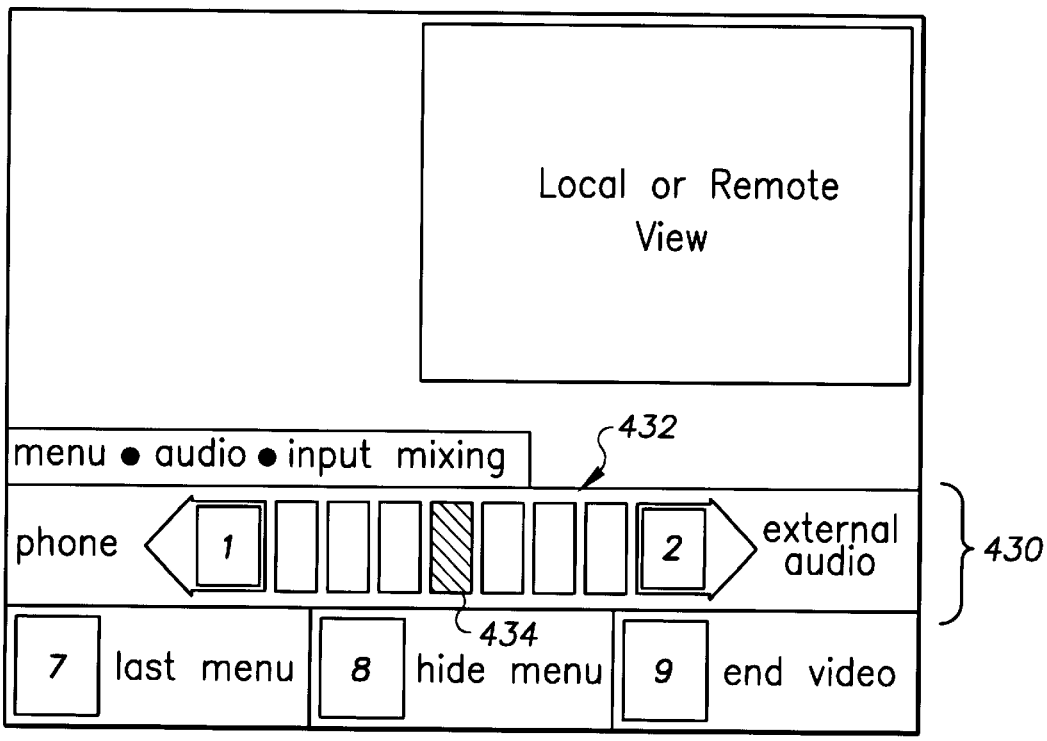

FIG. 6S is a block diagram that shows the layout and content of the input mixing menu 430 which is a sub-menu of the audio controls menu 420. The input mixing menu 430 includes a scale bar 432 that illustrates the relative relationship between telephone microphone input audio signals and external input audio signals for a present mixing level. The block 434 indicates the present mixing level. A phone option (indicator 1) is provided for increasing the mixed level of audio signals from the telephone microphone and decreasing the level of audio signals from the external audio source. An external audio option (indicator 2) is available for increasing the mixed level of audio signals from an external audio source and decreasing the level of audio signals from the telephone.

Figure 6T:
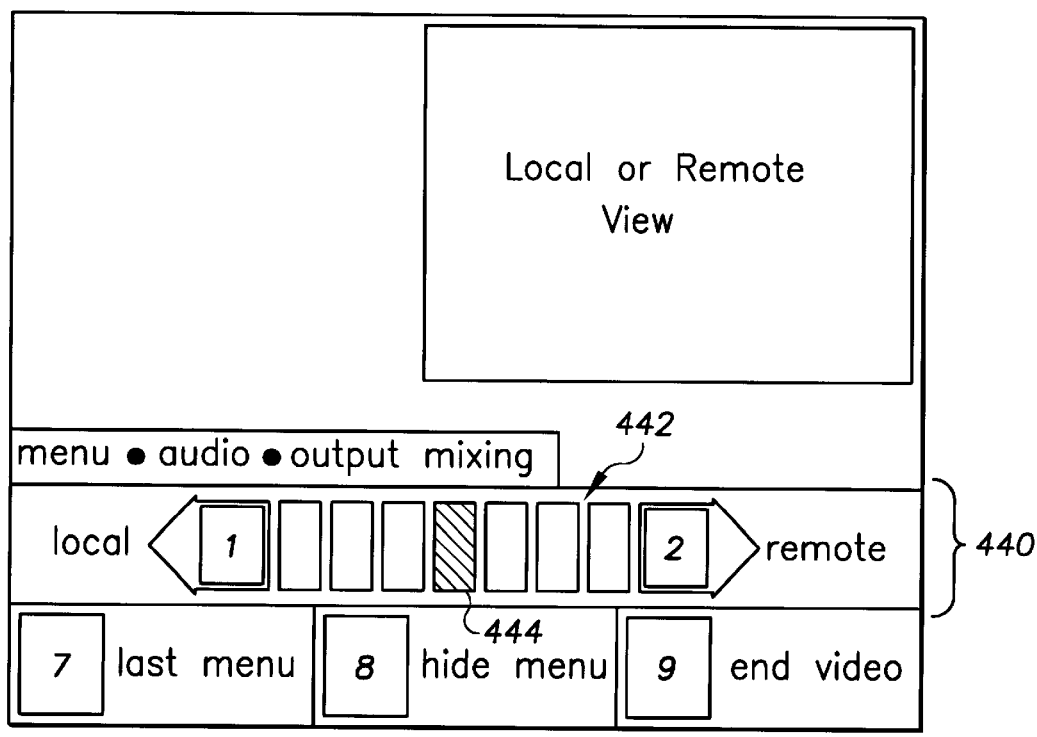

FIG. 6T is a block diagram that shows the layout and content of the output mixing menu 440 which is a sub-menu of the audio controls menu 420. The output mixing menu 440 includes a scale bar 442 that illustrates the relative relationship, for a present mixing level, between locally input audio signals and audio signals received from a remote source.

Block 444 indicates the present mixing level. A local option (indicator 1) is provided for increasing the mixed level of audio signals from the local source and decreasing the level of audio signals from the remote audio source. A remote audio option (indicator 2) is available for increasing the mixed level of audio signals from a remote audio source and decreasing the level of audio signals from the local source.

Figure 6U:
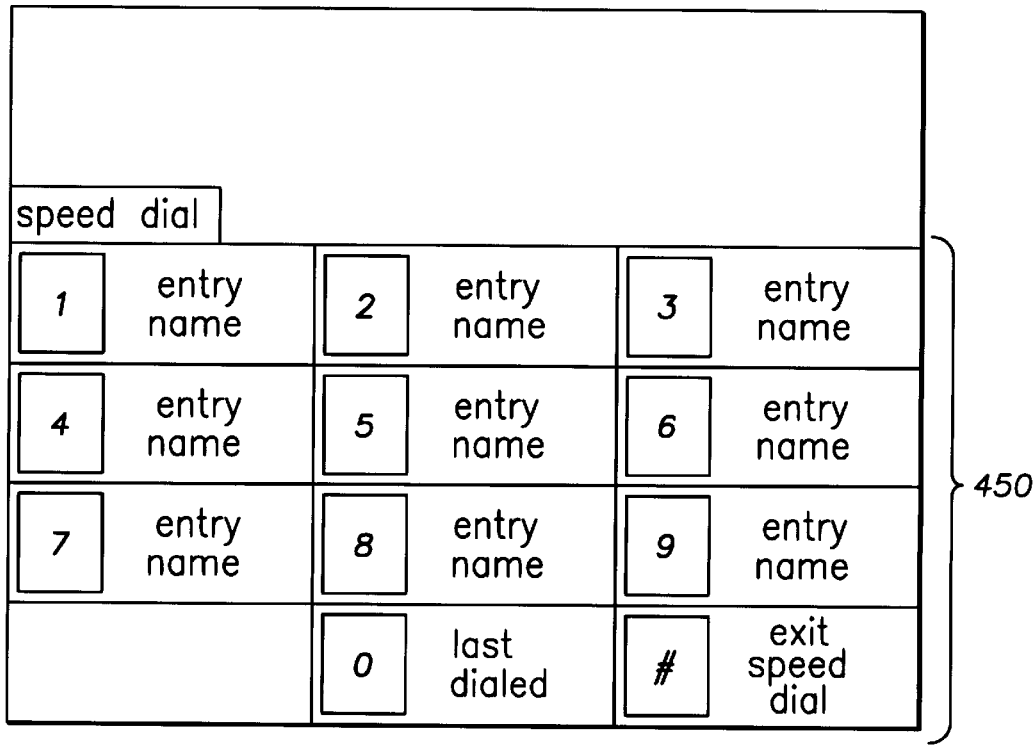

FIG. 6U is a block diagram that shows the layout and content of a speed dial menu 450 which is a sub-menu of the pre-call menu 312 of FIG. 6C. The speed dial menu includes a plurality of user-defined entry names that are associated with the indicators 1–9. In another menu, later described herein, the user defines the entry name and telephone number that are associated with an indicator. The speed dial menu also includes a last dialed option (indicator 0) for dialing the most recently dialed telephone number, and an exit option (indicator #) for exiting the speed dial menu 450 and retuning to the pre-call menu 312.

Figure 6V:
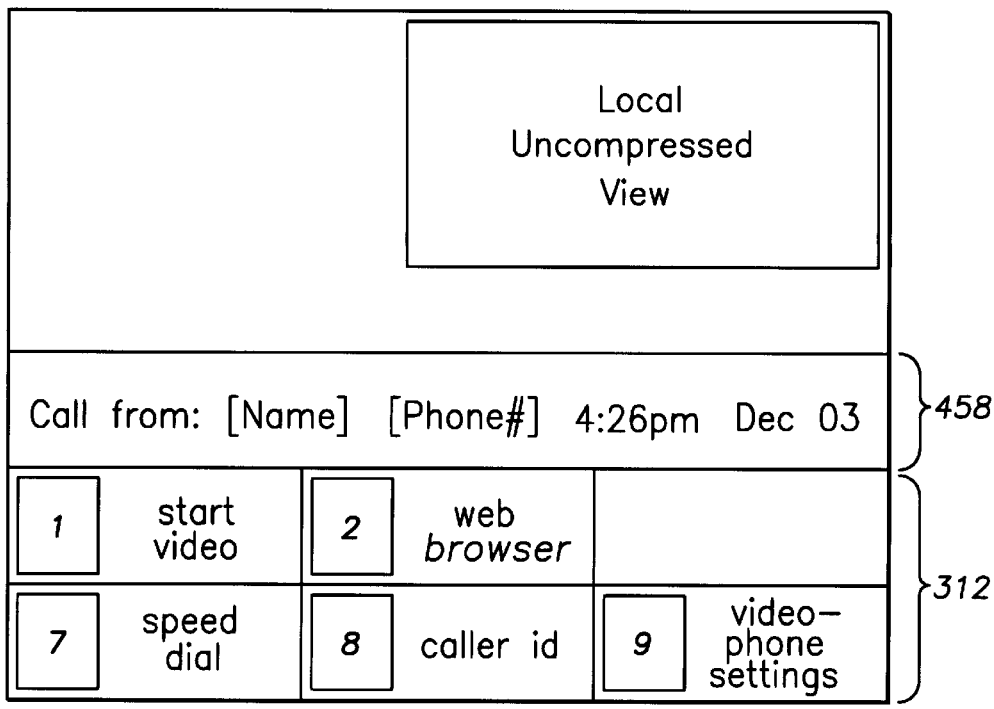

FIG. 6V is a block diagram that illustrates the layout and content of a caller-id data line 458 that is displayed in combination with the pre-call menu 312. For a user that subscribes to a caller-id service with a telephone service provider, the caller-id information is displayed for incoming telephone calls.

Figure 6W:
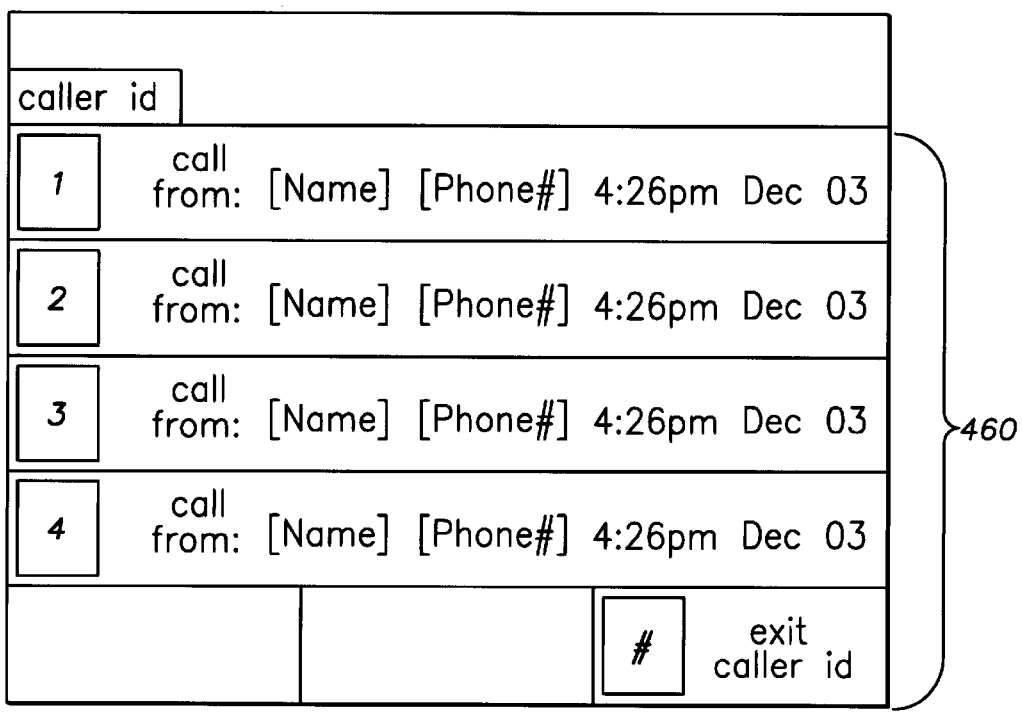

FIG. 6W is a block diagram that shows the layout and content of a caller-id menu 460 which is a sub-menu of the pre-call menu 312. The caller-id menu 460 includes options for dialing a telephone number of a recently received telephone call. The menu 460 includes options (indicators 1–4) for dialing one of four recently received calls.

Figure 6X:
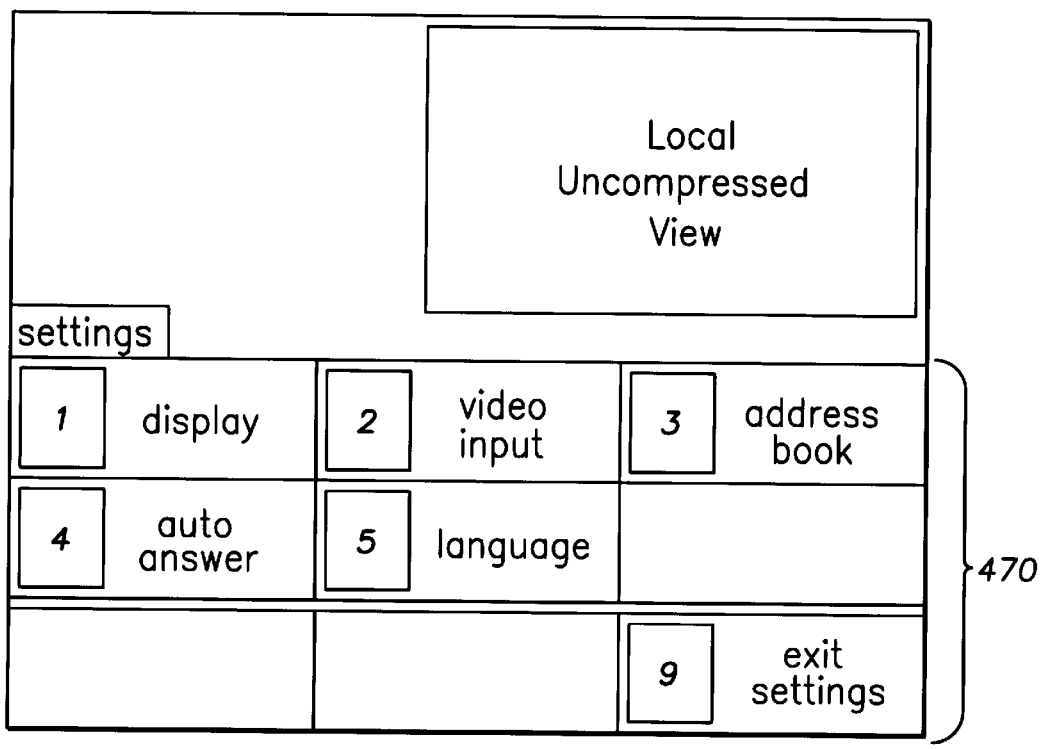

FIG. 6X is a block diagram that illustrates the layout and content of a settings menu 470 which is a sub-menu of the precall menu 312. The settings menu includes a display option (indicator 1) for changing display characteristics, a video input option (indicator 2) for changing the source of video input, an address book option (indicator 3) for updating speed dial information, an auto-answer option (indicator 4) for enabling automatic answering of incoming calls, a language option (indicator 5) for setting the language in which menu information is displayed, and an exit option (indicator 9) for returning to the pre-call menu 312.

Figure 6Y:
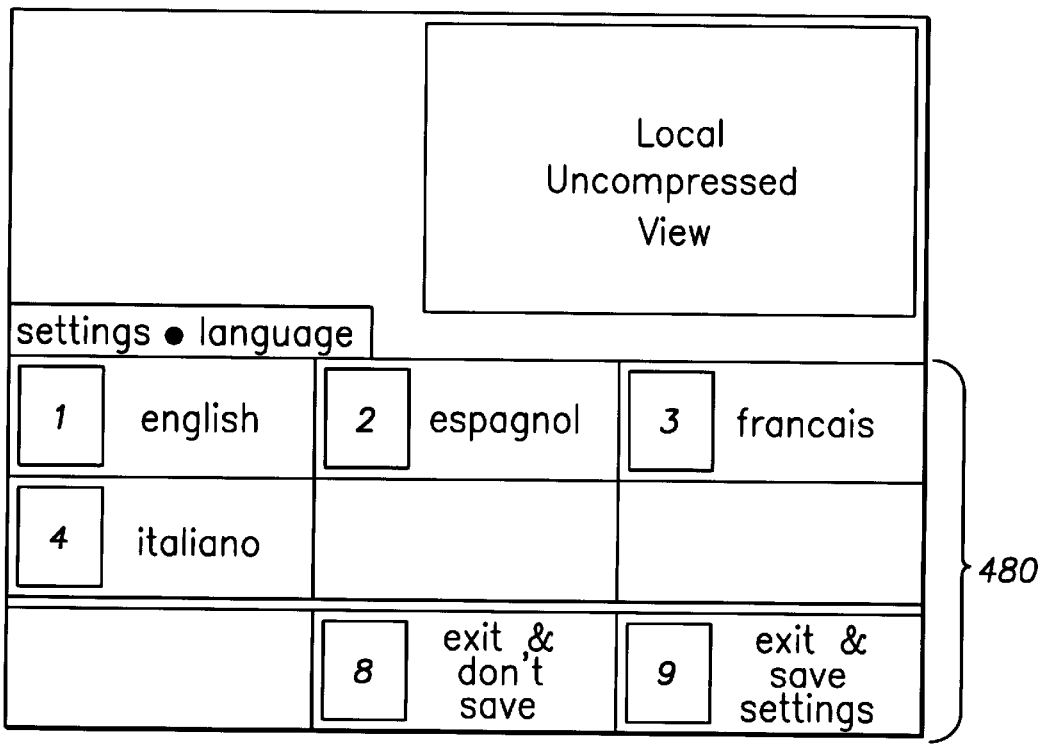

FIG. 6Y is a block diagram that illustrates the layout and content of a language menu 480 which is a sub-menu of the settings menu 470. The language menu 480 includes options for four example languages (indicators 1–4). Also included are options for exiting the language menu 480 without saving changes (indicator 8) and for exiting the language menu and saving changes (indicator 9).

Figure 6Z:
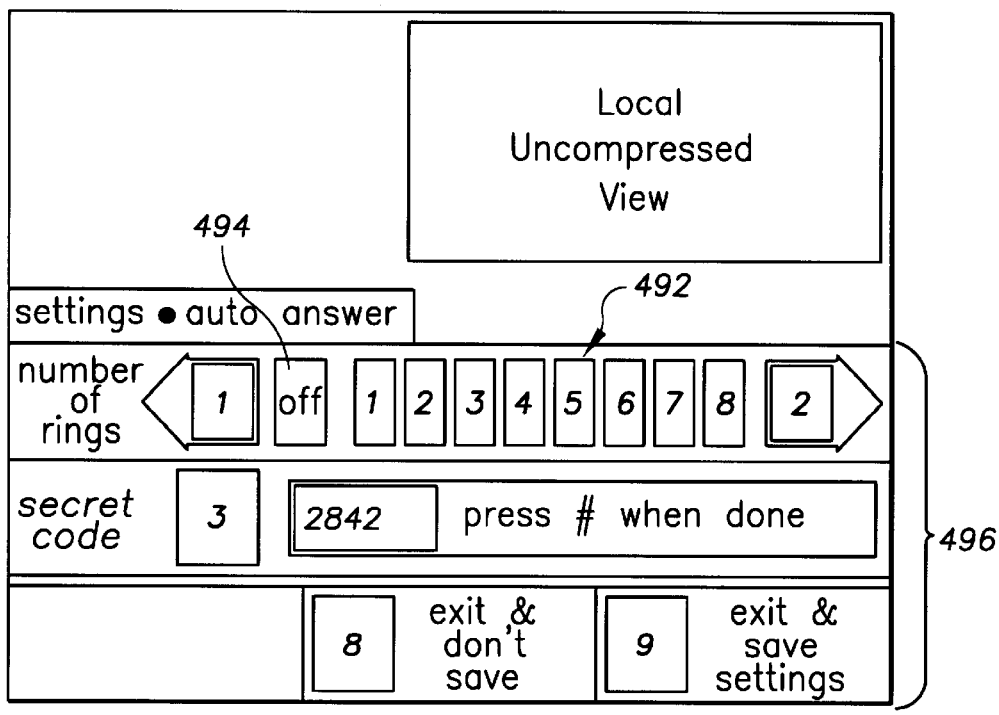
Figure 6A:
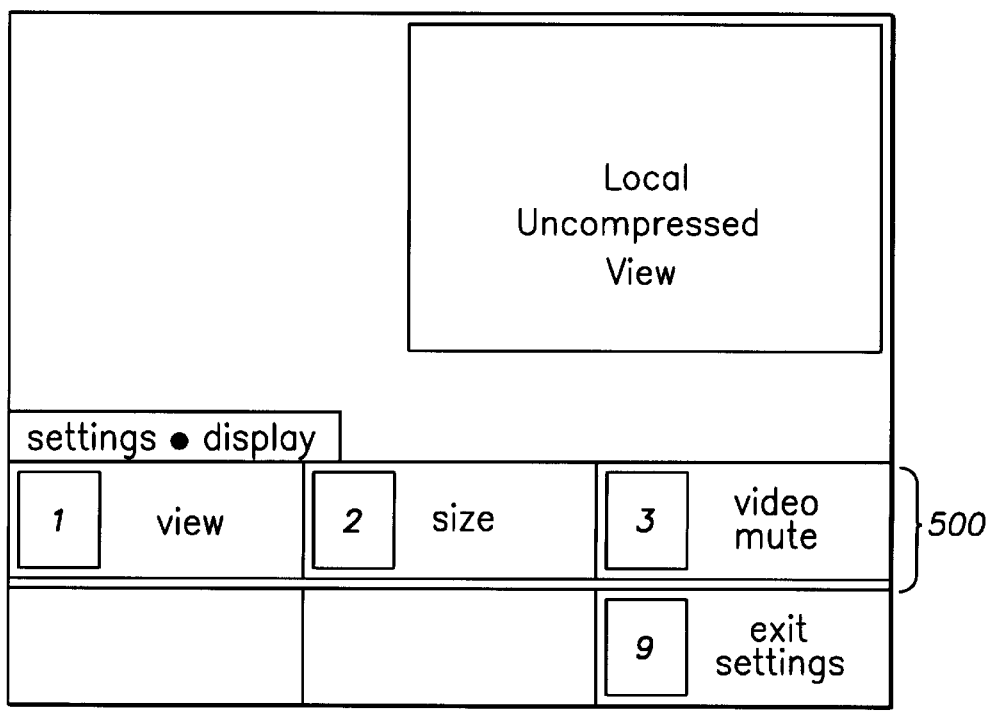
Figure 6B:
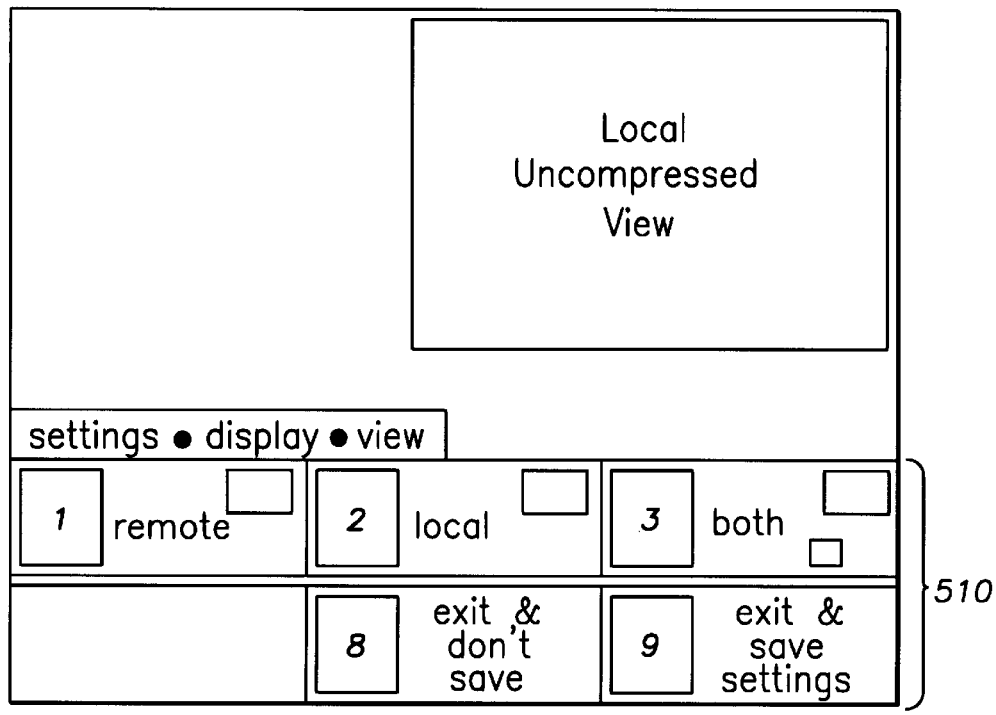
Figure 6C:
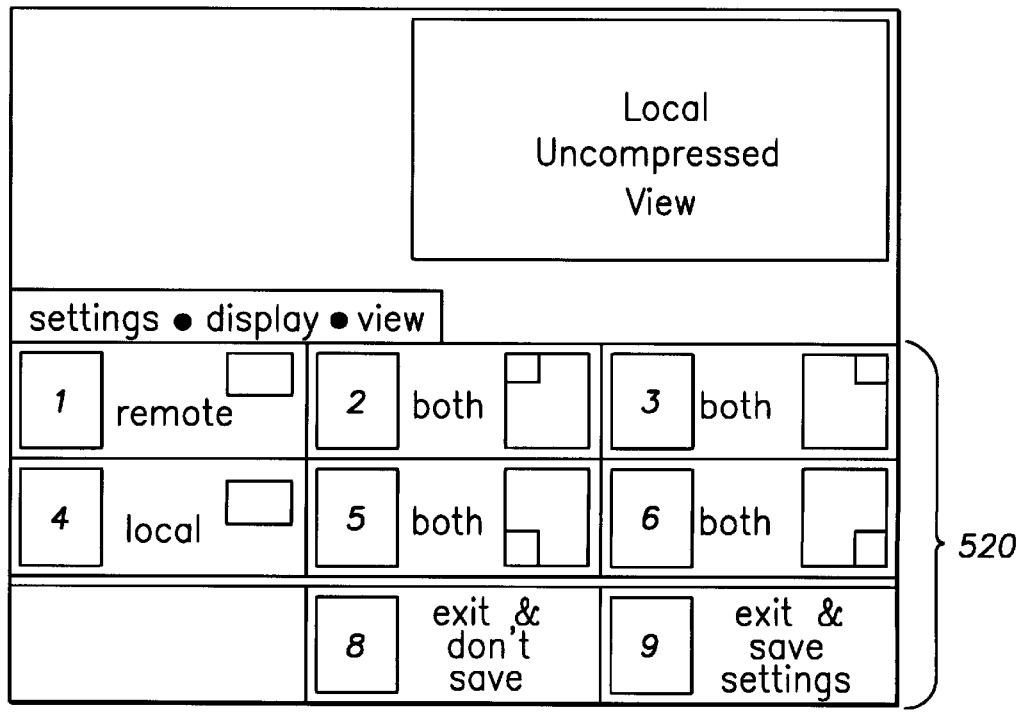
Figure 6D:
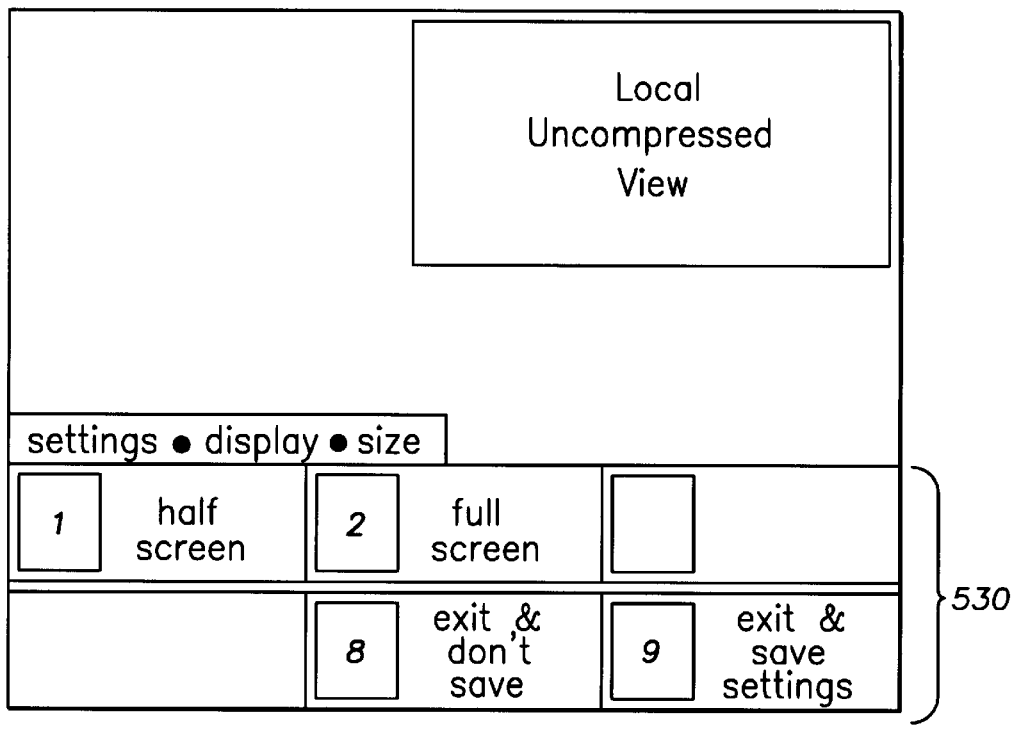
Figure 6E:
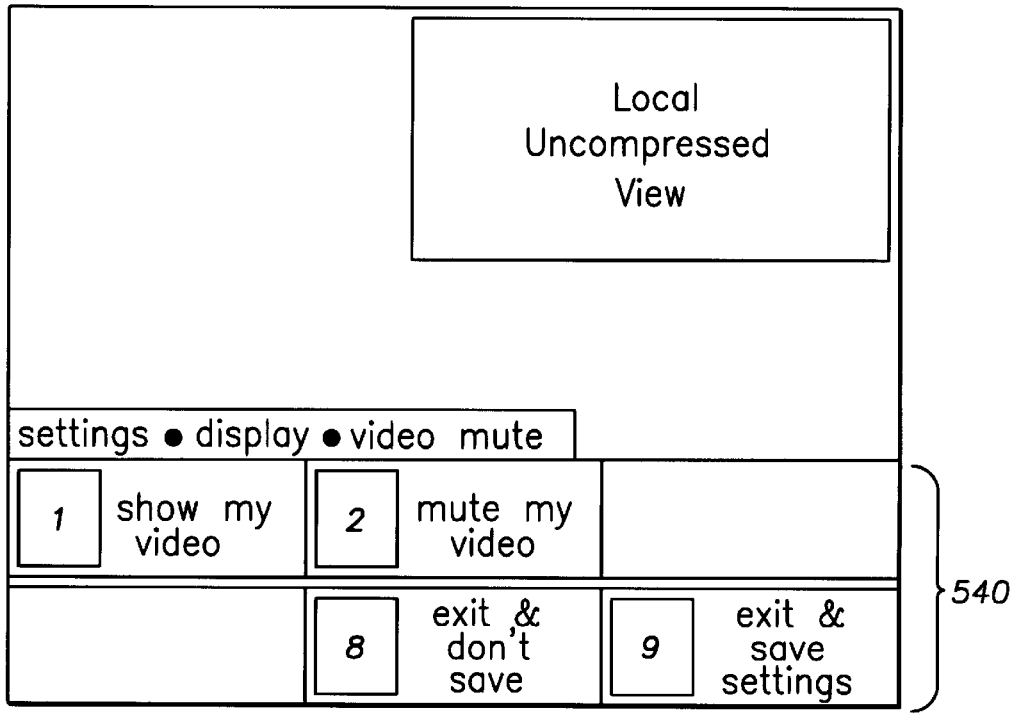
Figure 6F:
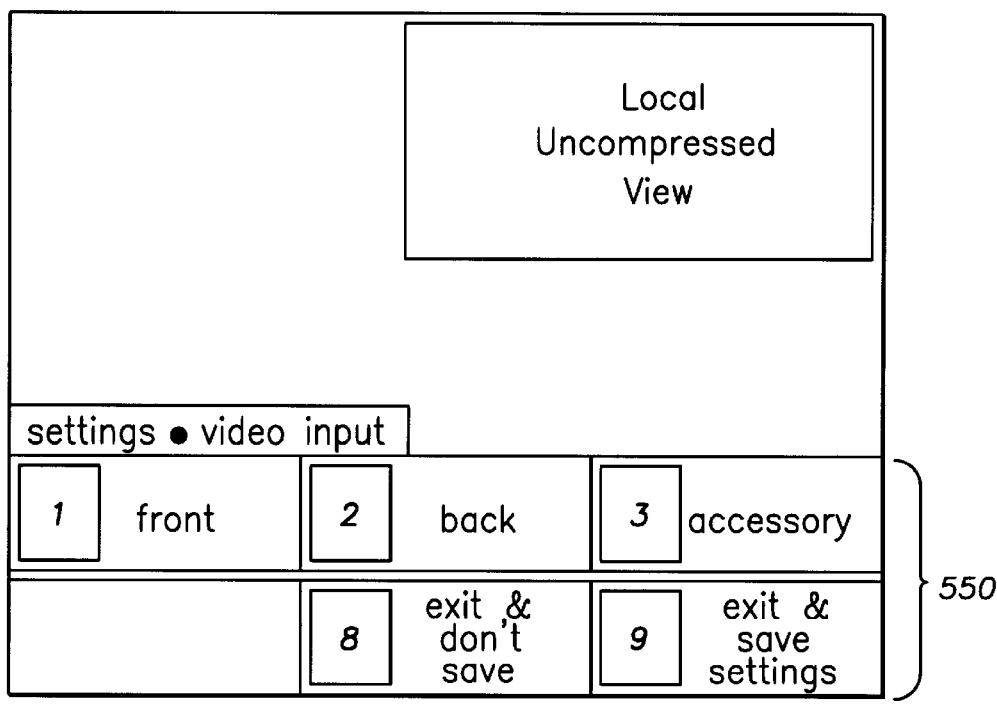
Figure 6G:
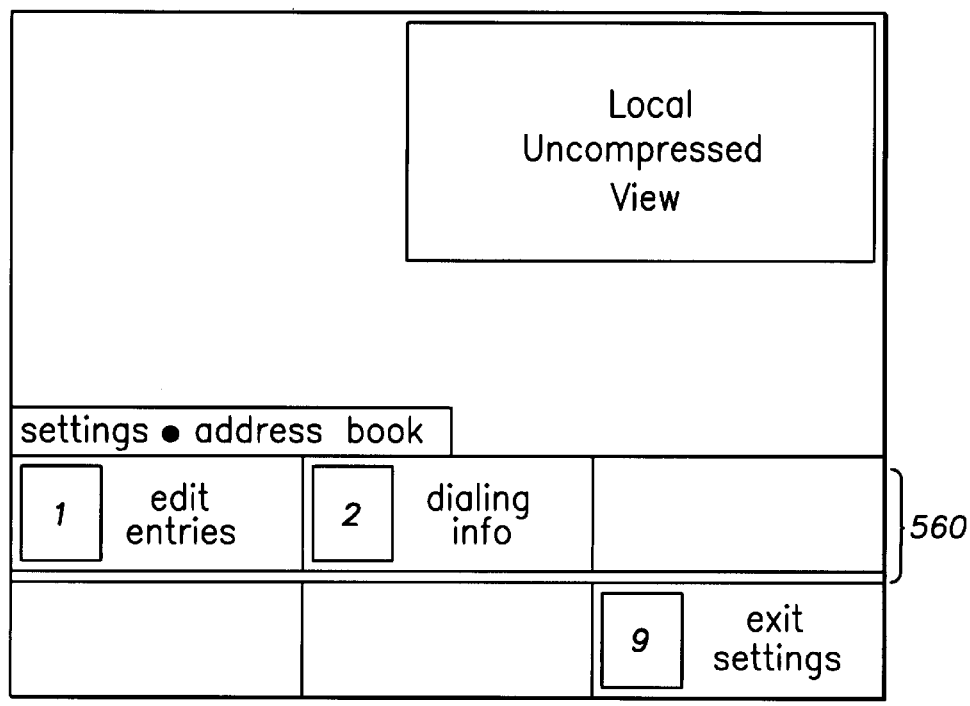
Figure 6I:
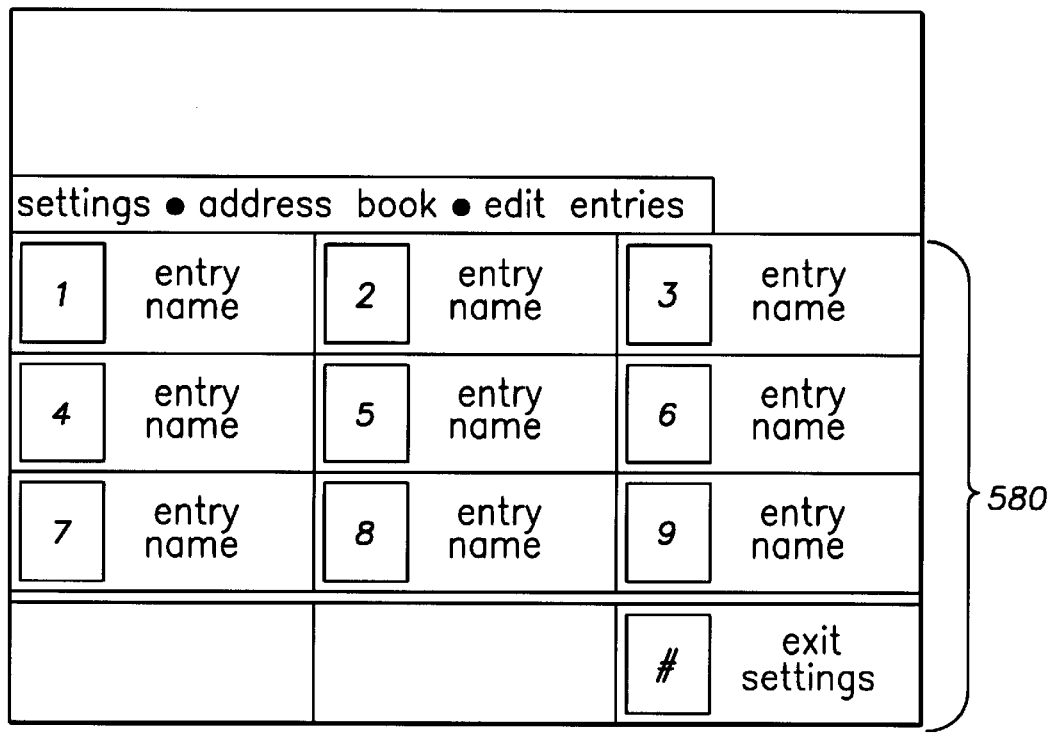
Figure 6H:
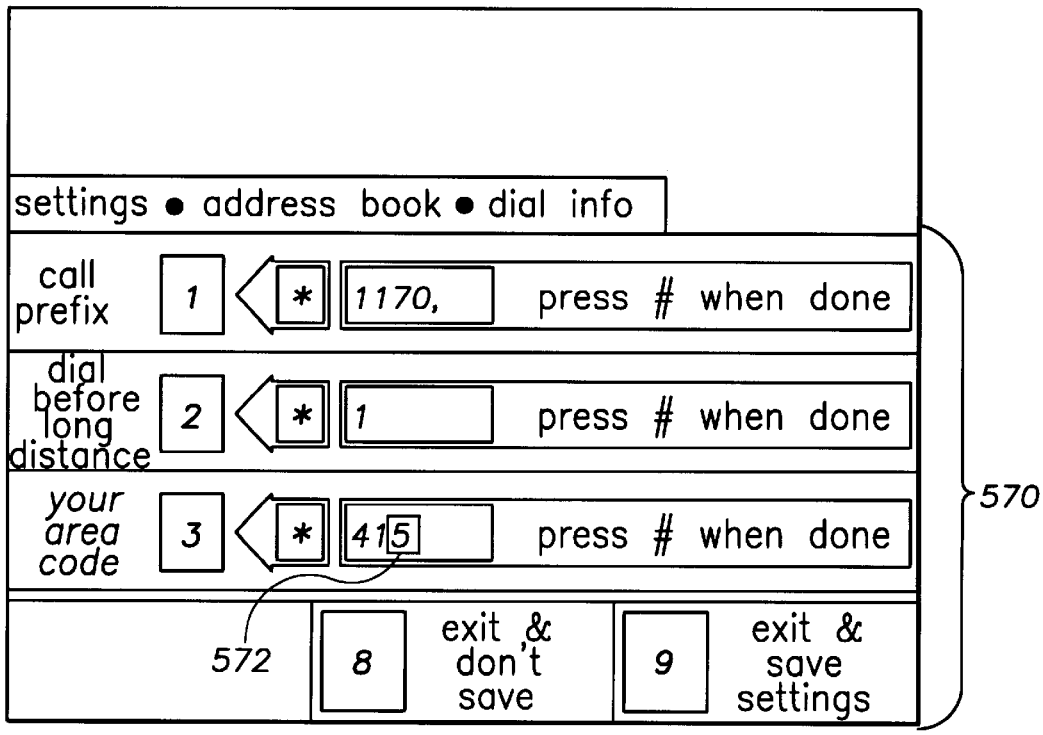
Figure 6J:
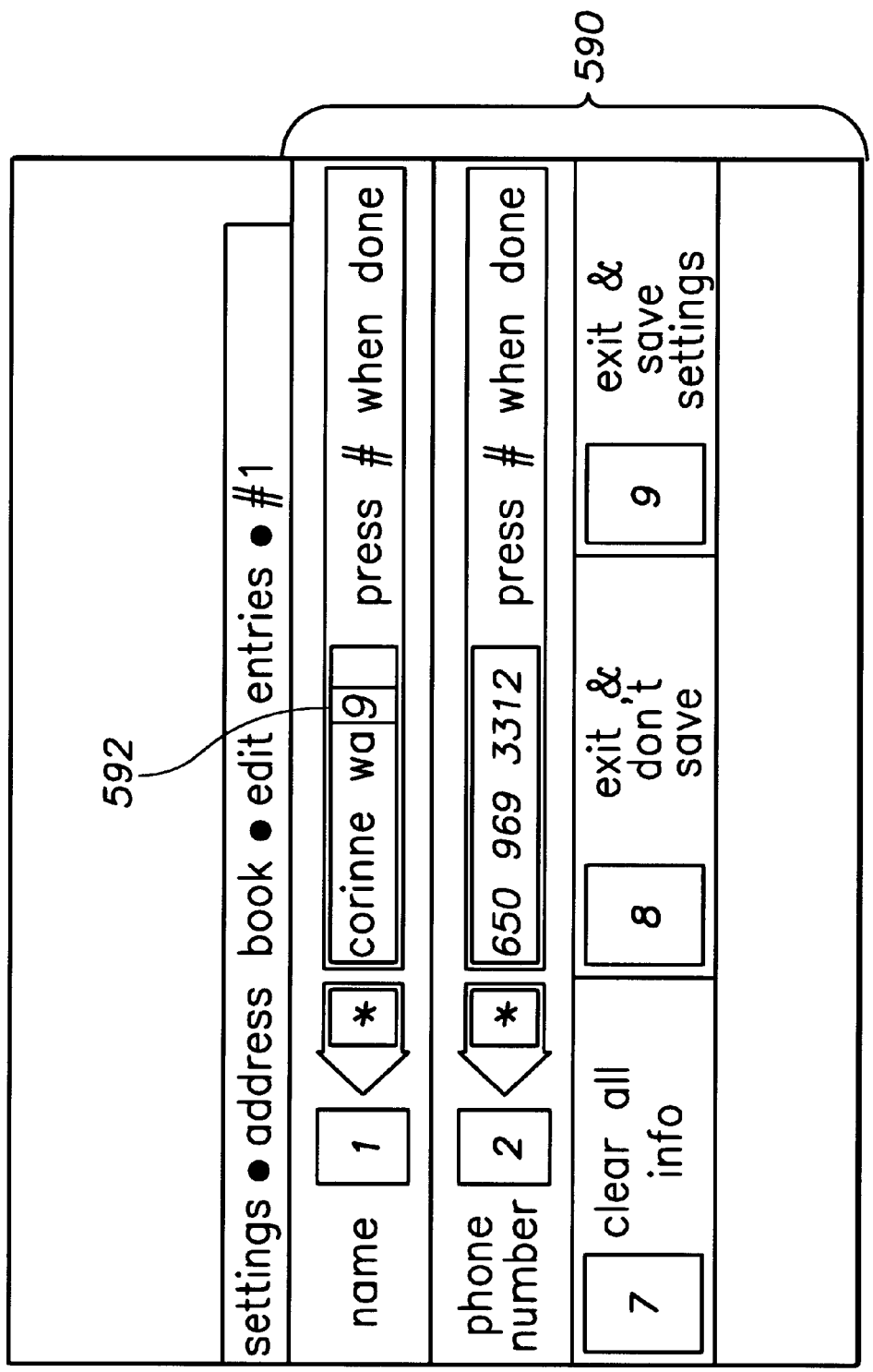

FIG. 6Z is a block diagram that illustrates the layout and content of an auto-answer menu 490. The auto-answer menu includes a scale bar 492 that indicates the number of rings that will occur before a call is automatically answered. Block 494 indicates the present state of the auto-answer feature, in this example it is off. Indicators 1 and 2 provide for decreasing and increasing the number of rings before a call is answered, respectively. A secret code option (indicator 3) is provided for configuring a security code. When the specified number of rings is detected, the videophone system waits for the calling party to enter the configured security code before allowing video functionality. To configure the security code, a user first pushes the 3-button on the telephone keypad 25 and thereafter presses the buttons for the desired code. The #-button must be pressed to exit from entering the code.

FIG. 6AA is a block diagram that illustrates the layout and content of the display menu 500 which is a sub-menu of the settings menu 470. The display menu 500 includes a view option (indicator 1) for selecting between local and remote video images, a size option (indicator 2) for selecting the size for display of the video images, and a video mute option (indicator 3) for suppressing transmission of video images.

The view menu 510 is a sub-menu of the display menu 500 and has a content and layout as shown in FIG. 6BB. The view menu 510 includes a remote option (indicator 1) for selecting display video images from a remote site, a local option (indicator 2) for selecting display video images from a local source, and a both option (indicator 3) for displaying both local and remote video images. Indicators 8 and 9 function as described above.

FIG. 6CC is another example embodiment of a view menu 520. The view menu 520 includes a remote option (indicator 1) and a location option (indicator 4) similar to that of view menu 510. However, view menu 520 also includes option for picture-in-picture placement of local and remote views as illustrated by indicators 2, 3, 5, and 6.

FIG. 6DD is a block diagram that shows the content and layout of a size menu 530 which is a sub-menu of the display menu 500. The size menu 530 includes a half screen option (indicator 1) for displaying video images using half the display screen, and a full screen option (indicator 2) for displaying video images using the full display screen.

FIG. 6EE illustrates the content and layout of a video mute menu 540 which is a sub-menu of the display menu 500. The video mute menu 540 includes a "show my video" option (indicator 1) for selecting transmission of video images from the local site to a remote site, and a "mute my video" option (indicator 2) for suppressing transmission of the video images from the local site to a remote site.

FIG. 6FF illustrates the content and layout of a video input menu 550 which is a sub-menu of the settings menu 470 (FIG. 6X). The video input menu 550 includes a front option (indicator 1) for selecting video images from a first source at the videophone system, a back option (indicator 2) for selecting video images from a second source at the videophone system, and an accessory option (indicator 3) for selecting video images from a third source at the videophone system.

FIG. 6GG illustrates the content and layout of an address book menu 560 which is a submenu of the settings menu 470. The address book menu 560 includes an edit entries option (indicator 1) for editing speed dial entries and a dialing info option (indicator 2) for establishing dialing information.

FIG. 6HH shows the content and layout of the dial info menu 570 which is a submenu of the address book menu 560. The dialing information is used for prefixing telephone calls with selected numbers and/or network codes. The dial info menu 570 includes a call prefix option (indicator 1), a long distance prefix option (indicator 2), and an area code option (indicator 3). The *-indicators are used for backspacing and deleting the previously entered character as indicated by block 572 over the character "5" in the area code data entry area.

FIG. 6II shows the content and layout of an edit entries menu 580 which is a sub-menu of the address book menu 560. The edit entries menu 580 includes a plurality of names and associated indicators 1–9 which are used for selection of an entry for which editing is desired.

FIG. 6JJ shows the content and layout of an edit entry menu 590 which is a sub-menu of the edit entries menu 580. The example edit entry menu 590 is associated with the indicator 1 of edit entries menu 580 of FIG. 6II. The edit entry menu 590 includes a name option (indicator 1) for entry of the name of a party that is called frequently, and a phone number option (indicator 2) for entry of the telephone number of the party. The *-indicators are used for backspacing and deleting the previously entered character, as illustrated by block 592. The "#" button must be pressed to quit entry of data in the name and phone number fields. The clear all info option (indicator 7) is available to clear all information in the data fields of the edit entry menu 590.

The present invention has been described with reference to particular embodiments. These embodiments are only examples of the invention's application and should not be taken as a limitation. Various adaptations and combinations of features of the embodiments disclosed are within the scope of the present invention as defined by the following claims.

The following appendices, as attached with this filing, and incorporated herein:

A. ViaTV Modular Videophone Owner's Guide for Models VC50 and VC55;

B. ViaTV Web Browser Owner's Guide;

C. ViaTV Modular Videophone Quick Start Guide for Models VC50 and VC55;

D. ViaTV Phone Owner's Guide for Models VC100/VC105;

E. ViaTV Phone Owner's Guide for Model VC100;

F. Addendum to Owner's Guide for ViaTV Phones VC100/105 Version 4 Software Upgrade;

G. Addendum to Owner's Guide for ViaTV Phones VC50/VC55 Version 4 Software Upgrade;

H. ViaTV Phone Model VC50 Brochure;

I. ViaTV Phone Model VC105 Brochure; and

J. ViaTV Phone Model VC55 Brochure.

What is claimed is:

1. A videophone apparatus with an on-screen telephone keypad user-interface, the videophone for communicating video and audio data over an external communication path and providing video data on a display, comprising:

a video source configured and arranged to capture images and to generate video data representing the images;

an external communication path interface circuit, configured and arranged to transmit and receive video and audio data over the external communication path;

a programmable processor circuit coupled to the video source and to the interface circuit and having a first section, including a DSP-type processor, configured and arranged to encode and decode video data, including the video data generated by the video source, and having a controller section, including a RISC-type processor, communicatively coupled to the first section, the controller section configured and arranged to execute a stored program for user controlled operation of the videophone apparatus, display a first menu on the display, the first menu referencing a first plurality of options for operating the videophone apparatus and having associated therewith respective indicators of telephone keypad buttons, receive from the telephone keypad a first selection signal indicative of a pressed button, and initiate an operation to control the videophone apparatus in response to the first selection signal;

nonvolatile-memory circuit coupled to the programmable processor circuit and arranged for storing the program for controlling operation of the videophone apparatus;

a display driver circuit responsive to the programmable processor circuit and configured and arranged to generate video data for a display; and a host controller configured and arranged to provide data, including configuration data, to the videophone apparatus.

2. The apparatus of claim 1, wherein the controller section is further configured and arranged to display a first telephone keypad indicator and an associated option for selecting for display video images collected at a first site of a videoconference, the first indicator associated with a first telephone keypad button, display a second telephone keypad indicator and an associated option for selecting for display video images collected at a second site of a videoconference, the second indicator associated with a second telephone keypad button, display video images from the first site in response to a selection signal generated from the first button, and display video images from the second site in response to a selection signal generated from the second button.

3. The apparatus of claim 2, wherein the controller section is further configured and arranged to display a third telephone keypad indicator and an associated option for selecting for display video images collected at both the first site and second site of a videoconference, the third indicator associated with a third telephone keypad button, and display video images from both the first site and the second site for a selection signal generated from the third button.

4. The apparatus of claim 1, wherein the controller section is further configured and arranged to display a plurality of keypad indicators and associated options for selecting camera settings, the plurality of indicators associated with respective telephone keypad buttons, and adjust camera settings in response to a selection signal generated from one of the plurality of buttons.

5. The apparatus of claim 4, wherein the plurality of indicator includes a first indicator associated with panning the camera, a second indicator associated with tilting the camera, and a third indicator associated with zooming the camera.

6. The apparatus of claim 1, wherein the controller section is further configured and arranged to display a first telephone keypad indicator and an associated option for adjusting a size of video images at the display, the first indicator associated with a first telephone keypad button, and display video images of a size in response to a selection signal generated from the first button.

7. The apparatus of claim 1, wherein the controller section is further configured and arranged to display a first telephone keypad indicator and an associated option for adjusting a quality characteristic of video images at the display, the first indicator associated with a first telephone keypad button, and provide video images according to the quality characteristic in response to a selection signal generated from the first button.

8. The apparatus of claim 7, wherein the quality characteristic is at least one of a resolution level coded in the video images and a frame rate.

9. The apparatus of claim 1, wherein the programmable processor circuit is further adapted to provide changable assignments of the telephone keypad buttons and adapted to change the assignments by loading an interpretation protocol.

10. The apparatus of claim 1, wherein the controller section is further configured and arranged to display first and second telephone keypad indicators and associated options for adjusting quality characteristics of video images at the display, the first and second indicators respectively associated with first and second telephone keypad buttons, and the quality characteristics including a frame rate and a level of detail coded in the video images, decrease the frame rate and increasing the level of detail coded in the video images in response to a selection signal generated from the first button, and decrease the level of detail coded in the video images and increasing the frame rate in response to a selection signal generated from the second button.

11. The apparatus of claim 1, wherein the controller section is further configured and arranged to display a telephone keypad indicator and an associated option for suppressing transmission of video images collected at a first site of a videoconference to a second site of a videoconference, the indicator associated with a telephone keypad button, and suppress transmission of video images collected at the first site to the second site in response to a selection signal generated from the telephone keypad button.

12. The apparatus of claim 1, wherein the controller section is further configured and arranged to display a telephone keypad indicator and an associated option for capturing and providing a still image at a first site in a videoconference, the indicator associated with a telephone keypad button, and capture and provide the still image to a second site in the videoconference in response to a selection signal generated from the telephone keypad button.

13. The apparatus of claim 1, wherein the controller section is further configured and arranged to display first and second telephone keypad indicators and associated options for mixing levels of audio signals from a first audio source and from a second audio source, the first and second indicators respectively associated with first and second telephone keypad buttons, decrease a mixed level of audio signals from the first audio source and increasing a mixed level of audio signals from the second audio source in response to a selection signal generated from the first button, and decrease the mixed level of audio signals from the second audio source and increasing the mixed level of audio signals from the first audio source in response to a selection signal generated from the second button.

14. The apparatus of claim 13, wherein the first audio source is a microphone input at a first site of a videoconference, and the second audio source is a line-level audio source at the first site of the videoconference.

15. The apparatus of claim 13, wherein the first audio source is a microphone input at a first site of a videoconference, and the audio signals from the second audio source are received from a second site of the videoconference.

16. The apparatus of claim 1, wherein the controller section is further configured and arranged to display caller identification data in response to an incoming telephone call.

17. The apparatus of claim 1, wherein the controller section is further configured and arranged to display a first telephone keypad indicator and an associated option for enabling automatic answering of an incoming telephone call to the videophone arrangement, the first indicator associated with a first telephone keypad button, and enable automatic answering of an incoming telephone call in response to a selection signal generated from the first button.

18. The apparatus of claim 1, wherein the controller section is further configured and arranged to display a telephone keypad indicator and an associated option for selecting from a plurality of sources of video images to provide for transmission from a first site of a videoconference to a second site of the videoconference, the indicator associated with a telephone keypad button, and provide video images from a selected source in response to a selection signal generated from the telephone keypad button.

19. The apparatus of claim 1, wherein the controller section is further configured and arranged to display digits entered on the telephone keypad for entry of a telephone number, and delete a most recently entered digit in response to a signal from a selected one of the telephone keypad buttons.

20. The apparatus of claim 1, wherein the controller section is further configured and arranged to detect a country code transmitted on the telephone service line and display user interface messages in a language associated with the country code.

21. A videophone apparatus with an on-screen infrared remote control keypad user-interface, the videophone for communicating video and audio data over a telephone service line and providing received video data on a display, comprising:

a video source configured and arranged to capture images and to generate video data representing the images;

an external communication path interface circuit, configured and arranged to transmit and receive video and audio data over the telephone service line;

a programmable processor circuit adapted to provide changable assignments of the telephone keypad buttons and adapted to change the assignments by loading an interpretation protocol, the programmable processor circuit having a first section, including a DSP-type processor, configured and arranged to encode and decode video data, including the video data generated by the video source, and having a controller section, including a RISC-type processor, communicatively coupled to the first section, the controller section configured and arranged to execute a stored program for user controlled operation of the videophone apparatus, display a first menu on the display, the first menu referencing a first plurality of options for operating the videophone apparatus and having associated therewith respective indicators of keypad buttons of the infrared remote control according to the loaded interpretation protocol, receive from the remote control keypad a first selection signal indicative of a pressed button, and initiate an operation to control the videophone apparatus in response to the first selection signal;

nonvolatile-memory circuit coupled to the programmable processor circuit and arranged for storing the program for controlling operation of the videophone apparatus; and a display driver circuit responsive to the programmable processor circuit and configured and arranged to generate video data for a display.

22. An on-screen telephone keypad user interface method for a videophone apparatus that includes a video source and a video display coupled to a processor circuit, the processor circuit configured and arranged to execute a program for user controlled operation of the videophone with a telephone keypad coupled to the processor circuit, comprising:

displaying a first menu on the display, the first menu referencing a first plurality of options for operating the videophone apparatus and having associated therewith respective indicators of telephone keypad buttons;

providing changable assignments of the telephone keypad buttons and changing the assignments by loading an interpretation protocol;

using the loaded interpretation protocol, receiving from a telephone keypad a first selection signal indicative of a pressed button; and initiating an operation to control the videophone apparatus in response to the first selection signal.

* * * * *

UNITED STATES PATENT AND TRADEMARK OFFICE
CERTIFICATE OF CORRECTION

PATENT NO. : 6,215,515 B1
DATED : April 10, 2001
INVENTOR(S) : Voois et al.

It is certified that error appears in the above-identified patent and that said Letters Patent is hereby corrected as shown below:

Column 1,
Lines 6-21, delete the whole paragraph text and replace with the following paragraph:
-- This is a continuation-in-part of U.S. patent application Ser. No. 09/005,053, filed on Jan. 9, 1998 (now U.S. Pat. No. 6,124,882), which is a continuation-in-part of U.S. patent application Ser. No. 08/908,826, filed on Aug. 8, 1997 (now U.S. Pat. No. 5,790,712), which is a continuation of U.S. patent application Ser. No. 08/658,917, filed on May 31, 1996 (now abandoned), which is a continuation of U.S. patent application Ser. No. 08/303,973, filed on Sep. 9, 1994 (now abandoned), which is a continuation of U.S. patent application Ser. No. 07/838,382, filed on Feb. 19, 1992 (now U.S. Pat. No. 5,379,351). --

Signed and Sealed this

Second Day of August, 2005

JON W. DUDAS
*Director of the United States Patent and Trademark Office*